United States Patent
Stacey et al.

(10) Patent No.: US 11,134,542 B2
(45) Date of Patent: Sep. 28, 2021

(54) MULTI-LINK DISCOVERY SIGNALING IN EXTREMELY HIGH THROUGHPUT (EHT) SYSTEMS

(71) Applicant: Intel Corporation, Santa Clara, CA (US)

(72) Inventors: Robert J. Stacey, Portland, OR (US); Carlos Cordeiro, Portland, OR (US); Chittabrata Ghosh, Fremont, CA (US); Daniel F. Bravo, Hillsboro, OR (US); Dibakar Das, Hilsboro, OR (US); Laurent Cariou, Portland, OR (US); Po-Kai Huang, San Jose, CA (US); Xiaogang Chen, Portland, OR (US); Arik Klein, Givaat Shmuel (IL); Danny Alexander, Neve Efraim Monoson (IL); Cheng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/825,028

(22) Filed: Mar. 20, 2020

(65) Prior Publication Data
US 2020/0221545 A1 Jul. 9, 2020

Related U.S. Application Data

(60) Provisional application No. 62/821,198, filed on Mar. 20, 2019, provisional application No. 62/835,352, (Continued)

(51) Int. Cl.
*H04W 84/12* (2009.01)
*H04W 88/10* (2009.01)
(Continued)

(52) U.S. Cl.
CPC ............. *H04W 88/10* (2013.01); *H04W 4/06* (2013.01); *H04W 48/16* (2013.01);
(Continued)

(58) Field of Classification Search
CPC ..... H04W 76/15; H04W 88/08; H04W 48/10; H04W 48/16; H04W 74/0808;
(Continued)

(56) References Cited

U.S. PATENT DOCUMENTS

2019/0387524 A1* 12/2019 Asterjadhi ............ H04W 72/02
2020/0137550 A1*  4/2020 Patil ...................... H04W 48/20

\* cited by examiner

*Primary Examiner* — Tu X Nguyen
(74) *Attorney, Agent, or Firm* — Schwegman Lundberg & Woessner, P.A.

(57) ABSTRACT

Embodiments of a multi-link access point (AP) device, station (STA) and method of communication are generally described herein. The multi-link AP device may comprise multiple APs. The multi-link AP device may encode a frame for transmission by one of the APs of the multi-link AP device. The multi-link AP device may encode the frame to include signaling to enable multi-link discovery of the APs of the multi-link AP device. The multi-link AP device may encode the signaling to include: a reduced neighbor report (RNR) element that identifies the APs of the multi-link AP device, and a multiple AP element. The multiple AP element may be configurable to include: common information for the APs of the multi-link AP device, and per-AP sub-elements that include per-AP information related to the APs of the multi-link AP device.

19 Claims, 20 Drawing Sheets

Related U.S. Application Data filed on Apr. 17, 2019, provisional application No. 62/844,238, filed on May 7, 2019, provisional application No. 62/835,346, filed on Apr. 17, 2019, provisional application No. 62/858,004, filed on Jun. 6, 2019, provisional application No. 62/858,462, filed on Jun. 7, 2019.

(51) Int. Cl.
*H04W 48/16* (2009.01)
*H04W 72/04* (2009.01)
*H04W 4/06* (2009.01)
*H04W 80/02* (2009.01)
*H04W 52/02* (2009.01)

(52) U.S. Cl.
CPC ... *H04W 52/0216* (2013.01); *H04W 72/0453* (2013.01); *H04W 80/02* (2013.01); *H04W 84/12* (2013.01)

(58) Field of Classification Search
CPC ............. H04W 84/12; H04W 52/0206; H04W 72/0426; H04W 76/38; H04W 8/005; H04W 92/20; H04L 25/0204; H04B 7/0413

See application file for complete search history.

900
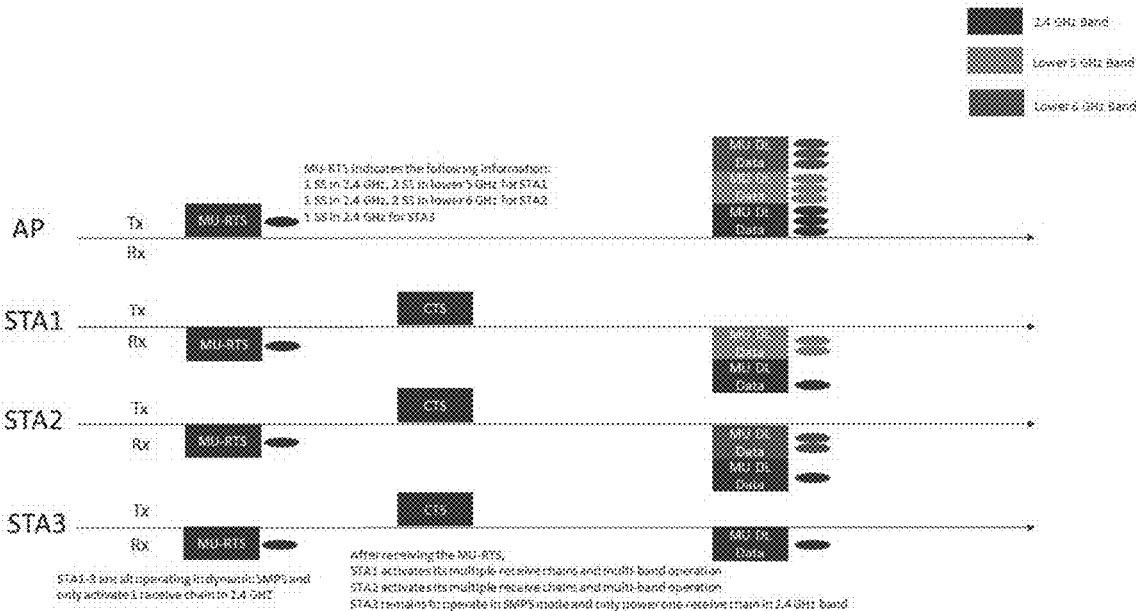
950
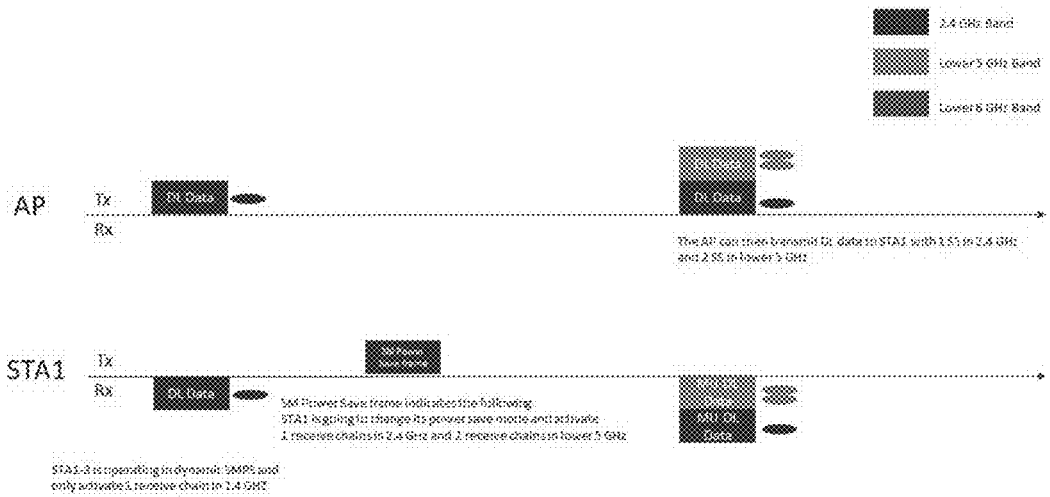
FIG. 9

1000
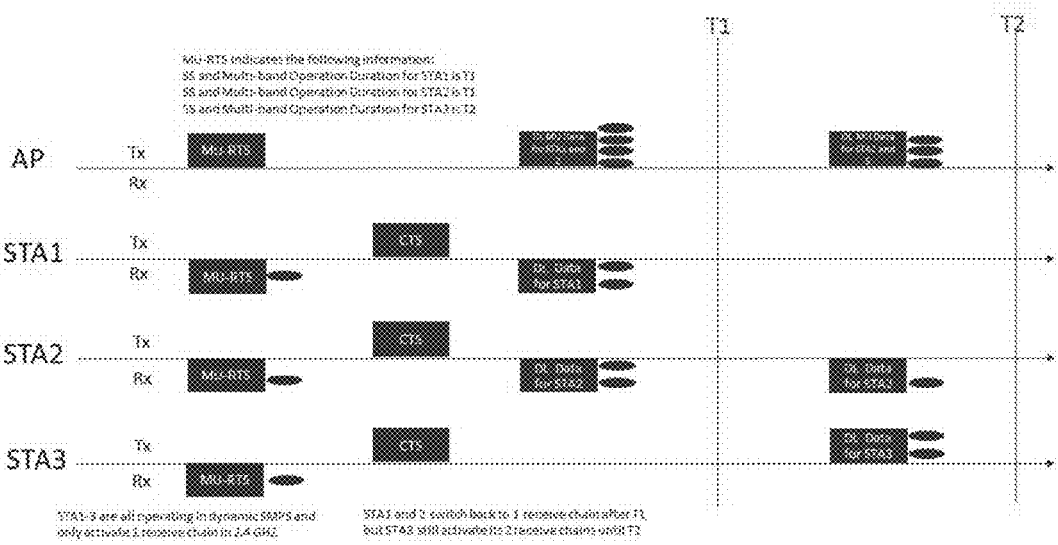
1050
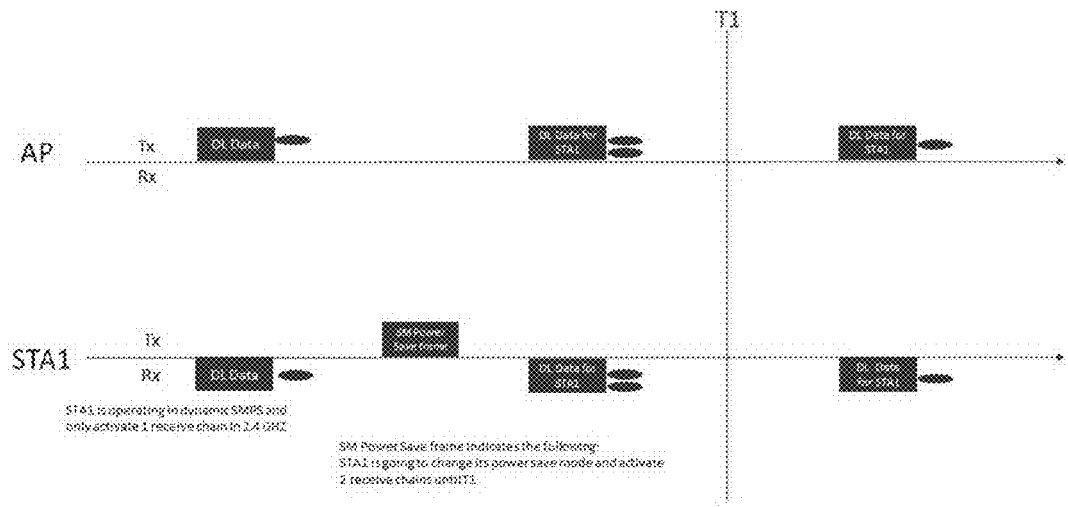
FIG. 10

1100
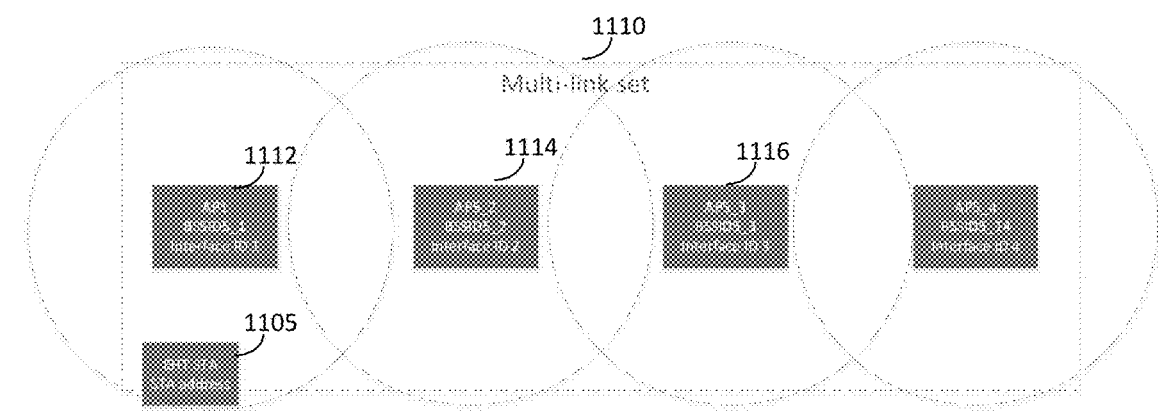
1150
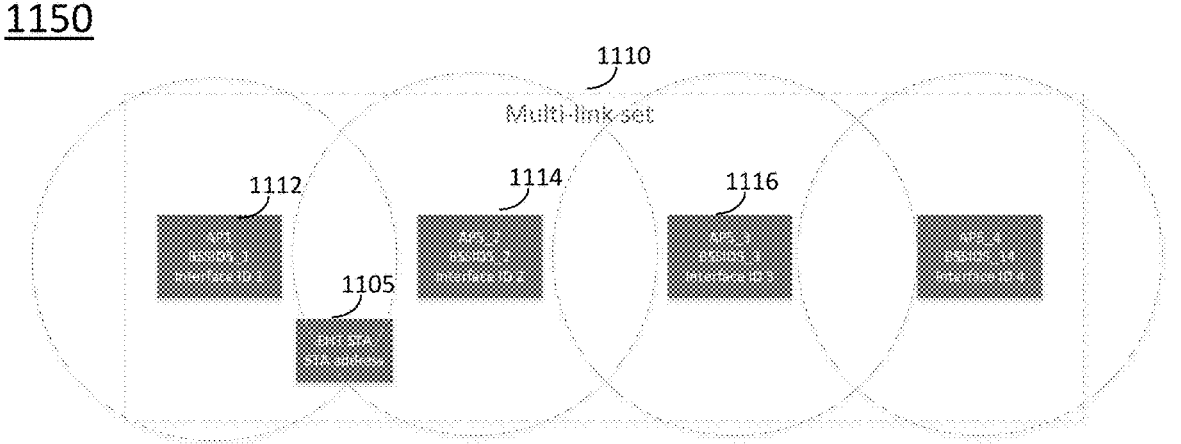
FIG. 11

1200

1300

1400

1500

1600

1700

1800

1900

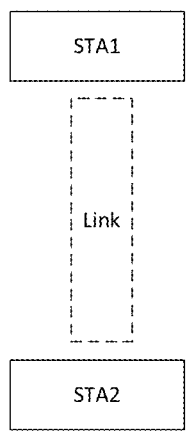
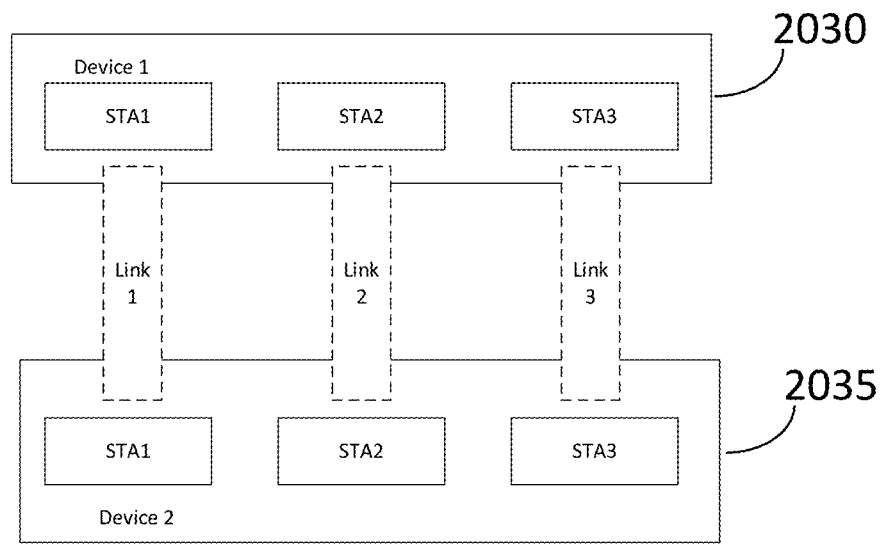
FIG. 20

2200

| Element ID | Length | Common information | Number of APs | AP description Subelements |
|---|---|---|---|---|
| Octets: 1 | 1 | xxx | 1 | variable |

Multi-link AP device element

| Element ID | Length | Control | RNR information | Policy | Optional Subelements |
|---|---|---|---|---|---|
| Octets: 1 | 1 | 1 | 1 or 13 | Xxx | Variable |

AP description sub-element

| Neighbor AP TBTT Offset | BSSID (optional) | Short-SSID (optional) | BSS parameters | Multi-link AP device information |
|---|---|---|---|---|
| Octets: 1 | 0 or 6 | 0 or 4 | 0 or 1 | 0 or 1 |

TBTT Information field format

| Part of Multi-AP device | APID | Reserved |
|---|---|---|
| 2240 | 1  2242 | 4  4 |

Multi-Link AP device information

MULTI-LINK DISCOVERY SIGNALING IN EXTREMELY HIGH THROUGHPUT (EHT) SYSTEMS

PRIORITY CLAIM

This application claims priority under 35 USC 119(e) to U.S. Provisional Patent Application Ser. No. 62/821,198, filed Mar. 20, 2019, and to U.S. Provisional Patent Application Ser. No. 62/835,352, filed Apr. 17, 2019, and to U.S. Provisional Patent Application Ser. No. 62/844,238, filed May 7, 2019, and to U.S. Provisional Patent Application Ser. No. 62/835,346, filed Apr. 17, 2019, and to U.S. Provisional Patent Application Ser. No. 62/858,004, filed Jun. 6, 2019, and to U.S. Provisional Patent Application Ser. No. 62/858,462, filed Jun. 7, 2019, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for multi-link discovery signaling in EHT systems.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 9 illustrates example multi-band operation in accordance with some embodiments;

FIG. 10 illustrates example operations in accordance with some embodiments;

FIG. 11 illustrates example scenarios in accordance with some embodiments;

FIG. 20 illustrates example scenarios in accordance with some embodiments;

FIG. 22 illustrates example elements in accordance with some embodiments; and

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
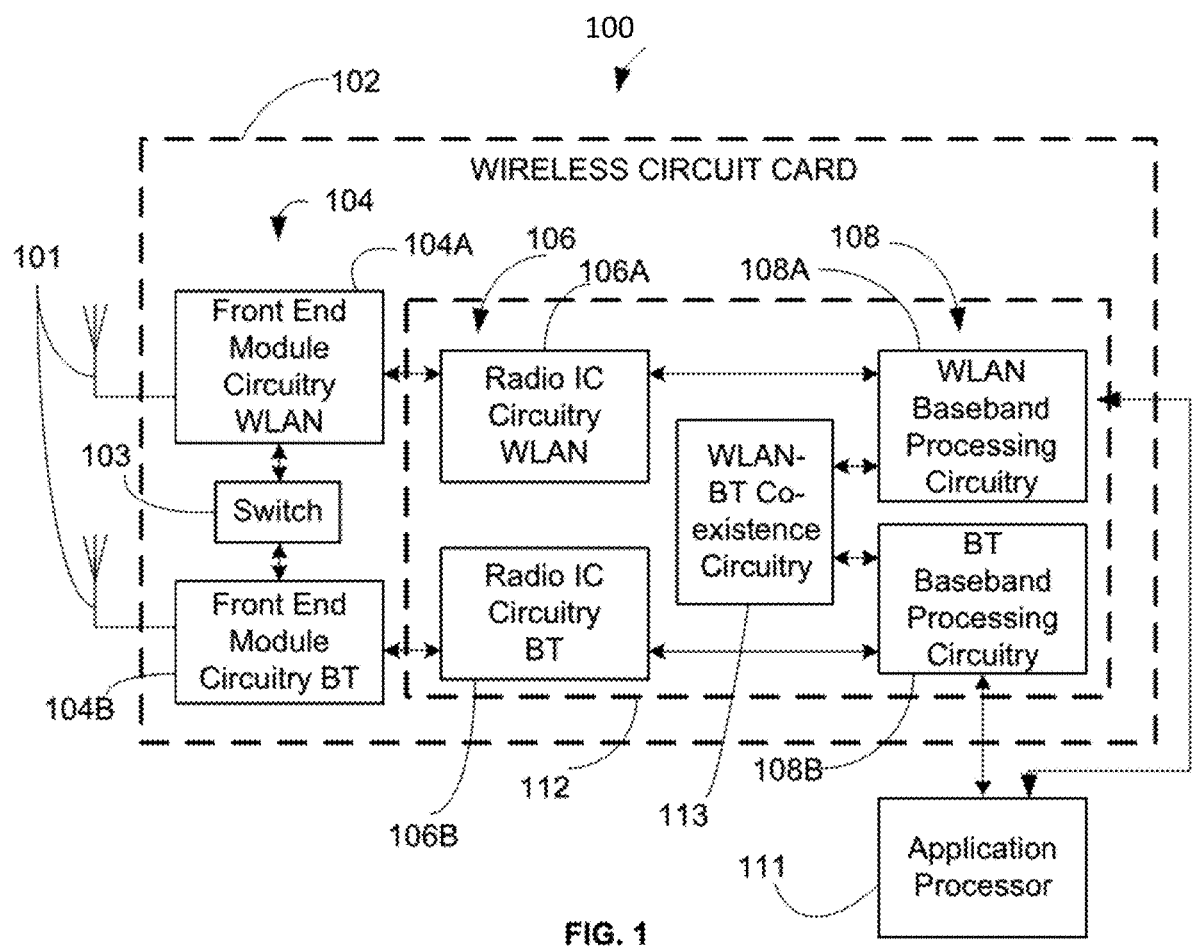
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
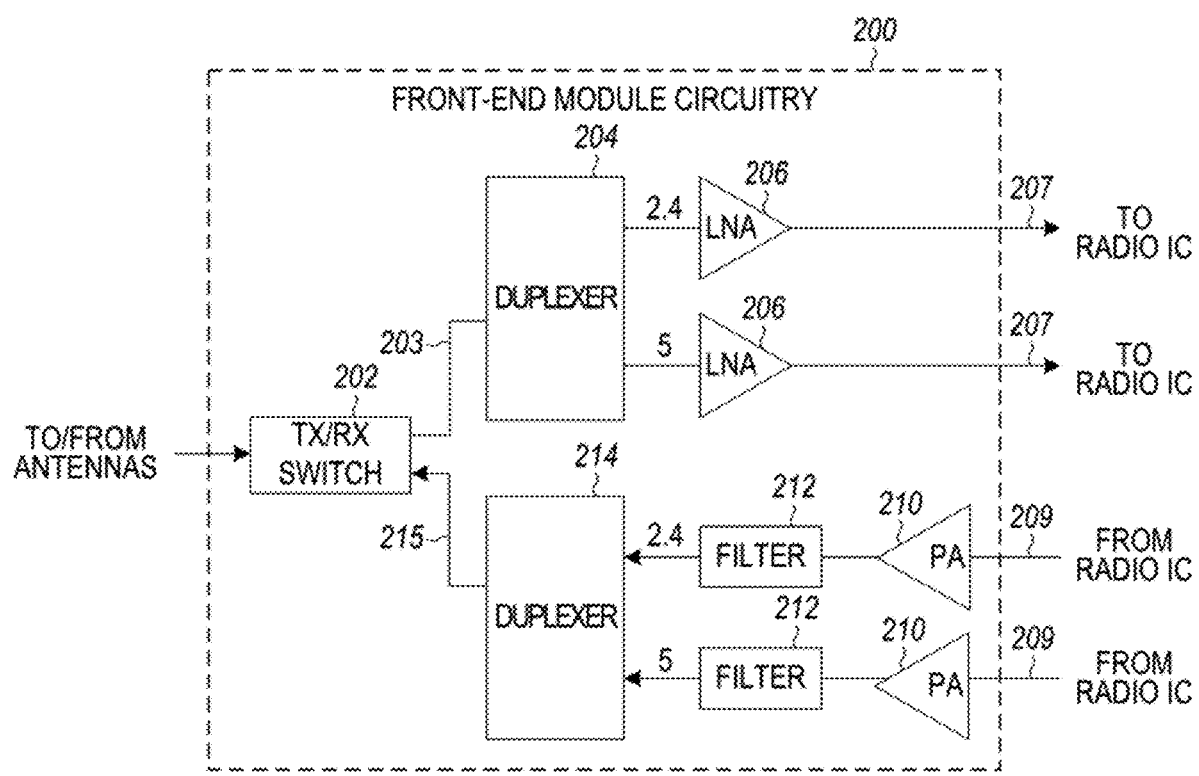
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
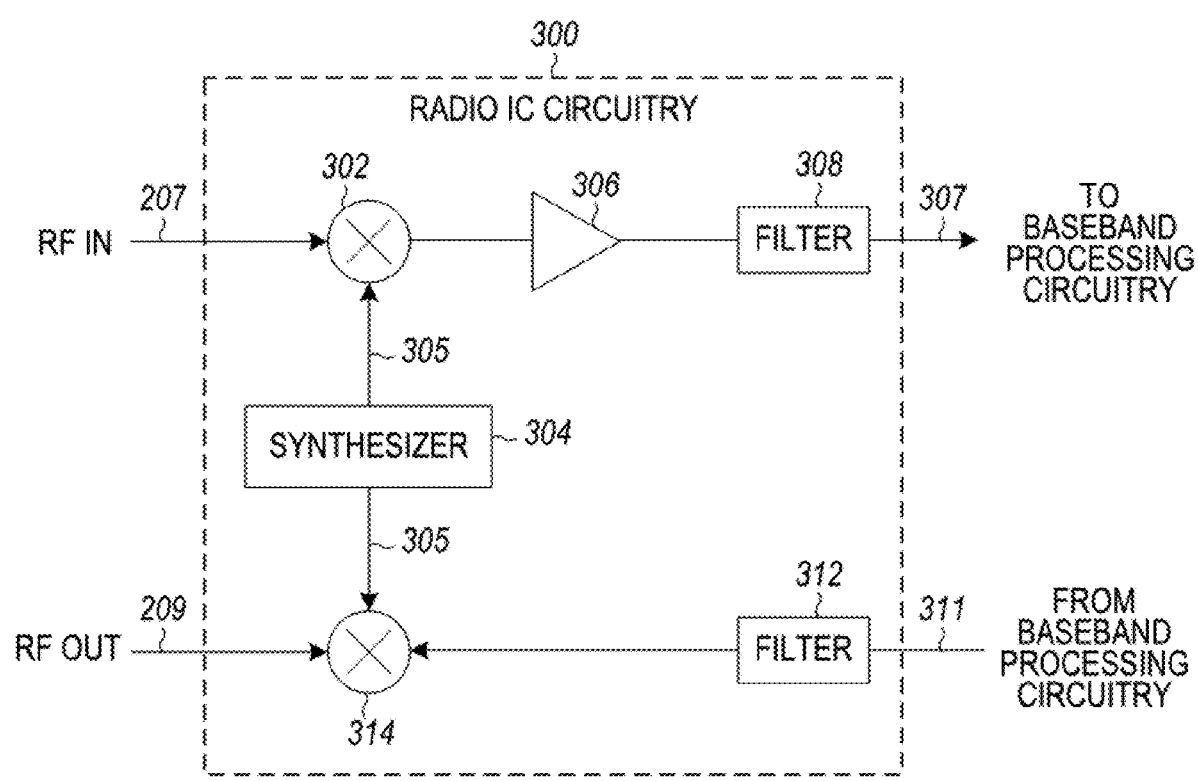
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
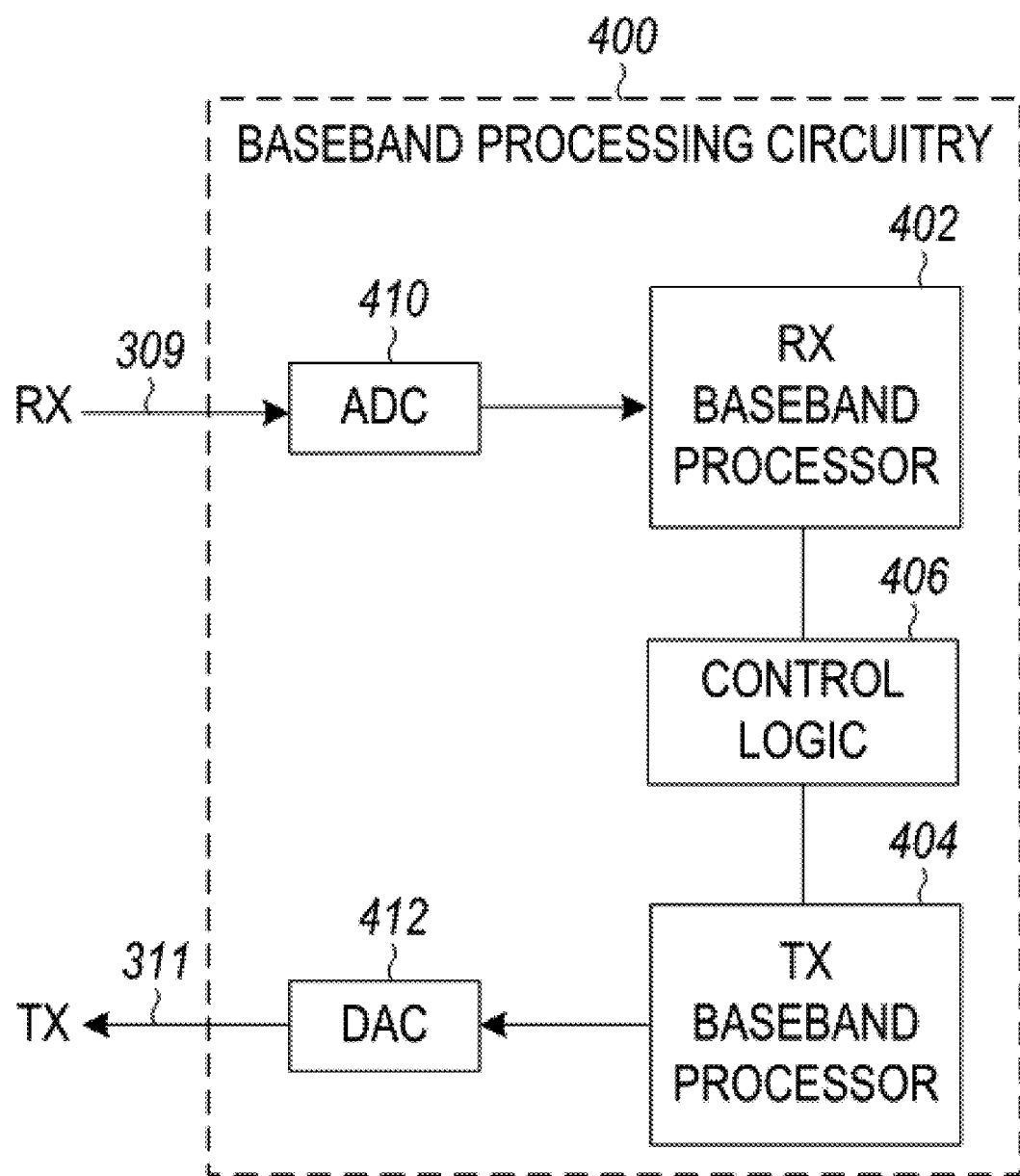
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5A:
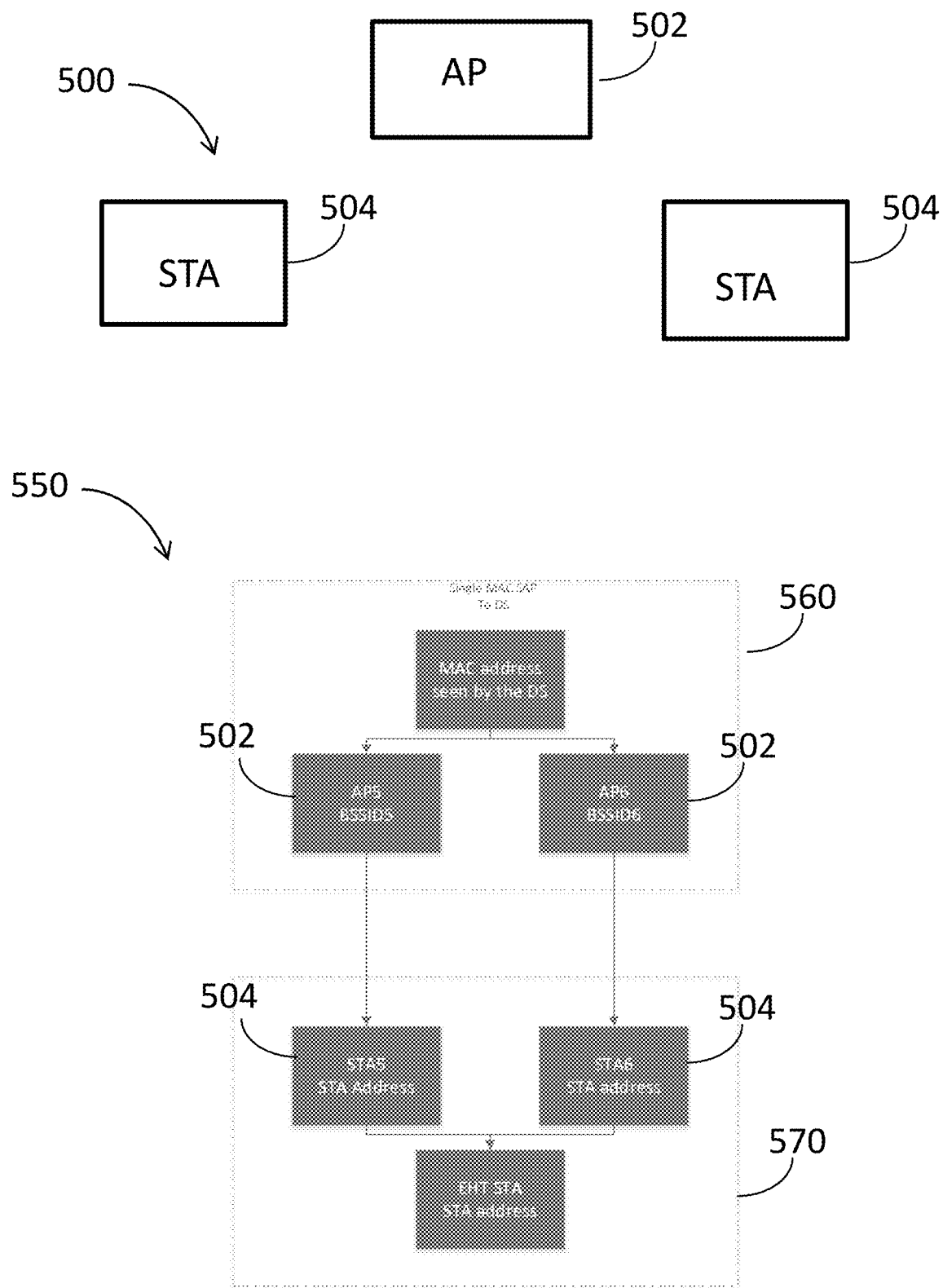
FIG. 5A illustrates a WLAN in accordance with some embodiments.
Figure 5B:
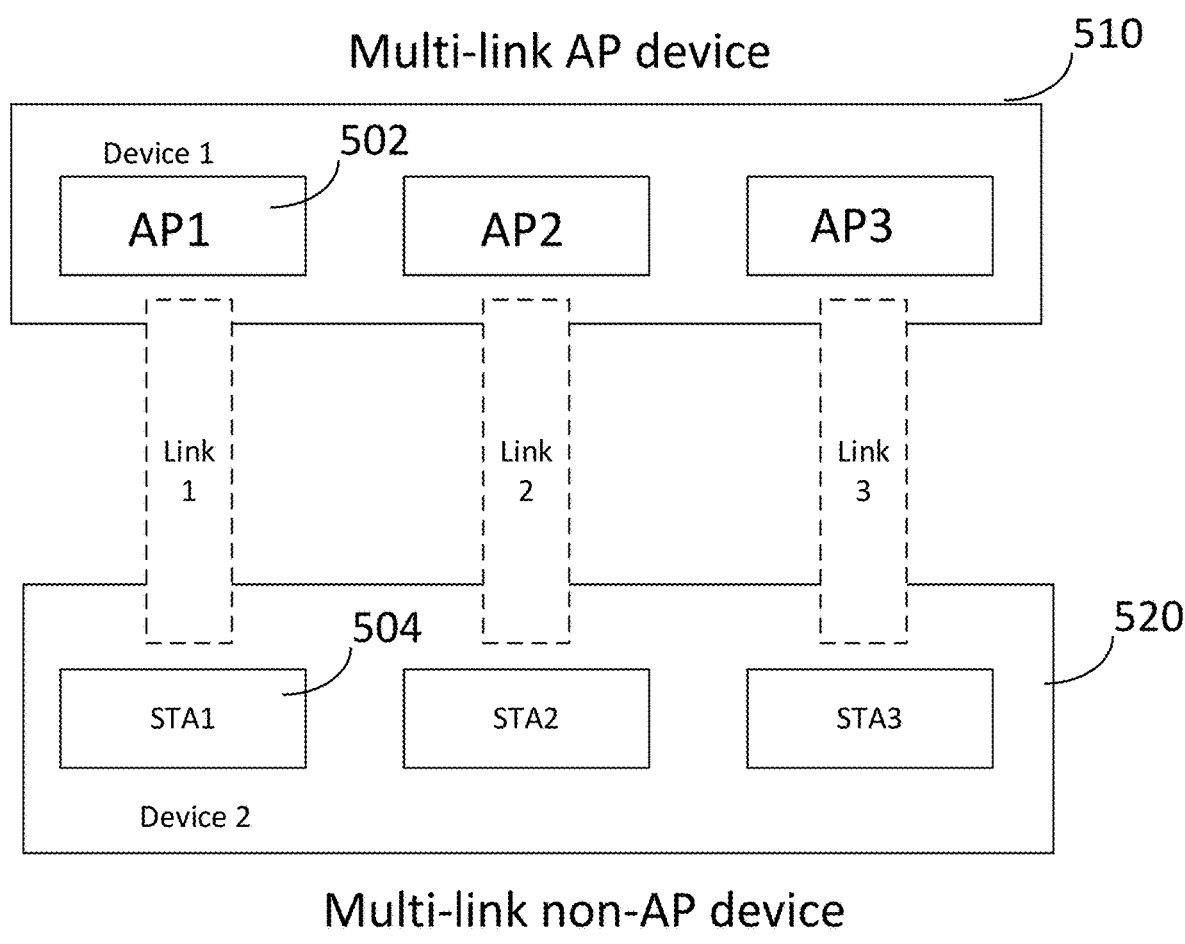
FIG. 5B illustrates example multi-link devices in accordance with some embodiments.

FIG. 5A illustrates a WLAN 500 in accordance with some embodiments. FIG. 5B illustrates example multi-link devices in accordance with some embodiments. In some descriptions herein, "FIG. 5" may include FIG. 5A and FIG. 5B.

In some embodiments, the WLAN 500 may comprise an AP 502, and one or more stations (STAs) 504. Embodiments are not limited to the number of elements (such as APs 502, STAs 504, multi-link AP device 510, multi-link STA device 520, and/or other) shown in FIG. 5.

In some embodiments, the AP 502 may communicate with one or more of the STAs 504. Embodiments are not limited to a single AP 502, as the WLAN 500 may comprise one or more APs 502, in some embodiments. In some embodiments, the AP 502 may be a base station. The AP 502 and/or STAs 504 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The AP 502 and/or STAs 504 may operate in accordance with one or more of IEEE 802.11 a/b/g/n/ac/ad/af/ah/aj/ay, EHT, or another legacy wireless communication standard. In some embodiments, the STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol.

In some embodiments, the STA 504 is a logical entity that is a singly addressable instance of a medium access control (MAC) and physical layer (PHY) interface to the wireless medium (WM). In some embodiments, a link, in the context of an IEEE 802.11 medium access control (MAC) entity, is a physical path consisting of exactly one traversal of the wireless medium (WM) that is usable to transfer MAC service data units (MSDUs) between two stations (STAs). In some embodiments, a multi-link AP device is a multi-link device, wherein each STA 504 in the multi-link device is an AP 502. A multi-link AP device 510 has an address to communicate to DSM. Referring to FIG. 5B, the multi-link AP device 510 comprises multiple APs 502. The multi-link STA device 520 (which may also be referred to as a multi-link non-AP device 520 in some descriptions herein) comprises multiple STAs 504.

In some embodiments, a Multi-link AP device 510 has multiple APs 502. When scanning the channel where there is one AP 502 of the Multi-link AP device 510, EHT STAs have to be able to discover the Multi-link AP device 510 along with the AP 502. This means that all or at least some of the other APs 502 that are part of the multi-link AP device 510 have to be discoverable by the STAs 504. In the vast majority of cases, these APs 502 will also allow legacy STAs 504 (up to HE STAs) to associate to then and therefore have to be discovered by legacy STAs 504 as well. In some cases, we can consider that some APs 502 are EHT only and should not be discoverable by legacy STAs 504. In some embodiments, a mechanism for an out-of-band discovery of APs 502 that are part of a multi-link AP device 510 may be used.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame and/or MAC protocol data unit (MPDU) may be configured for transmitting a number of spatial streams, which may be in accordance with MU-MIMO and may be in accordance with OFDMA. In other embodiments, the AP 502, STA 504, multi-link AP device 510, multi-link STA device 520, multi-link device and/or other device may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with one or more of the figures described herein.

In example embodiments, the STA 504, the AP 502, the multi-link AP device 510, multi-link STA device 520 and/or multi-link device are configured to perform the methods and operations/functions described herein in conjunction with one or more of the figures described herein. In example embodiments, an apparatus of the STA 504 and/or an apparatus of the AP 502 and/or an apparatus of a multi-link AP device 510 and/or an apparatus of a multi-link STA device 520 and/or an apparatus of a multi-link device are configured to perform the methods and functions described herein in conjunction with one or more of the figures described herein. The term Wi-Fi may refer to one or more of the IEEE 802.11 communication standards.

Figure 6:
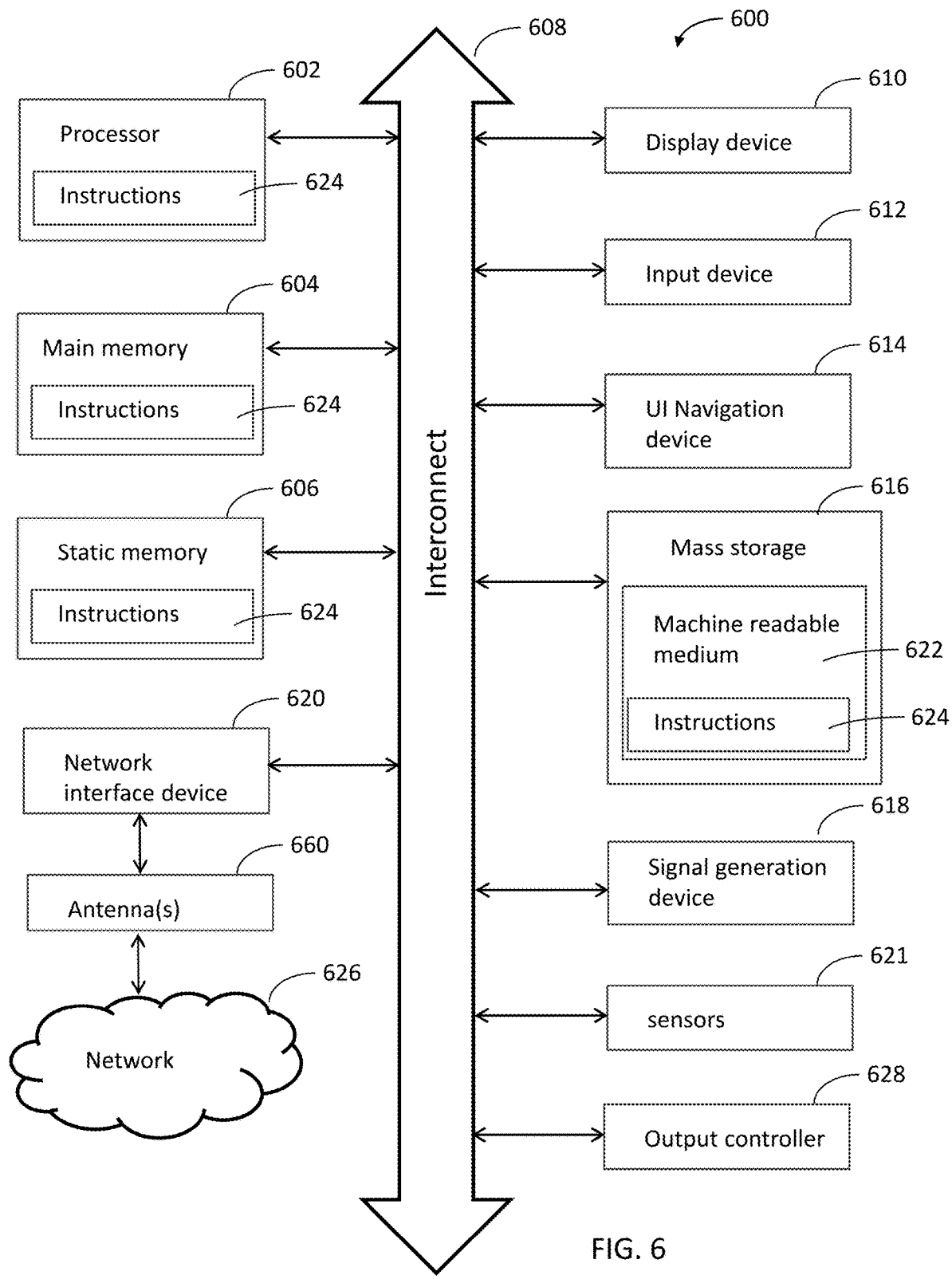
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, multi-link AP device 510, multi-link STA device 520, multi-link device, other device, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
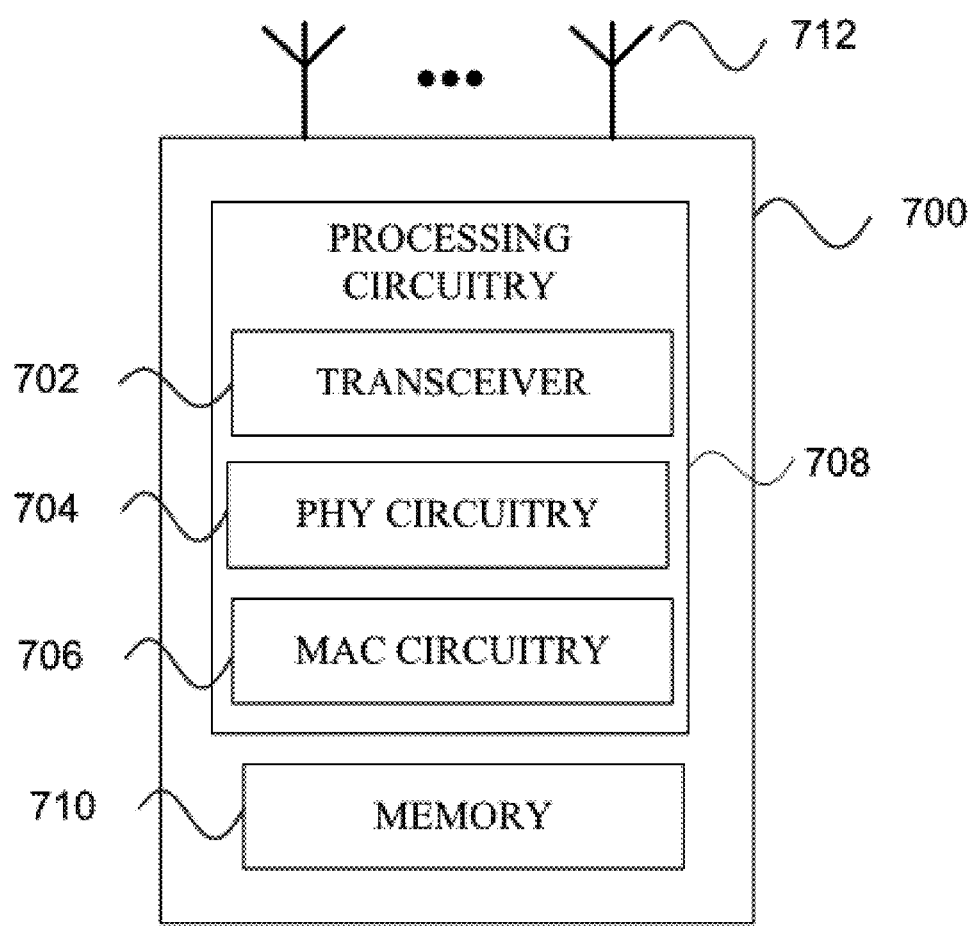
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502, STA 504, multi-link AP device 510, multi-link STA device 520 and/or multi-link device (e.g., FIG. 5). An STA 504, AP 502, multi-link AP device 510, multi-link STA device 520, multi-link device and/or other device may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504, multi-link AP device 510, multi-link STA device 520, multi-link device and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502, STA 504, multi-link AP device 510, multi-link STA device 520, multi-link device and/or other device), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, the multi-link AP device 510 may comprise multiple APs 502. The multi-link AP device 510 may be configured for multi-link communication on a plurality of channels. For each channel of the plurality of channels, at least one of the APs 502 of the multi-link AP device 510 may be configured for communication on the channel. The multi-link AP device 510 may encode a frame for transmission by one of the APs 502 of the multi-link AP device 510. The multi-link AP device 510 may encode the frame to include signaling to enable multi-link discovery of the APs 502 of the multi-link AP device 510. The multi-link AP device 510 may encode the signaling to include: a reduced neighbor report (RNR) element that identifies the APs 502 of the multi-link AP device 510, and a multiple AP element. The multiple AP element may be configurable to include: common information for the APs 502 of the multi-link AP device 510, and per-AP sub-elements that include per-AP information related to the APs 502 of the multi-link AP device 510. These embodiments are described in more detail below.

Figure 8:
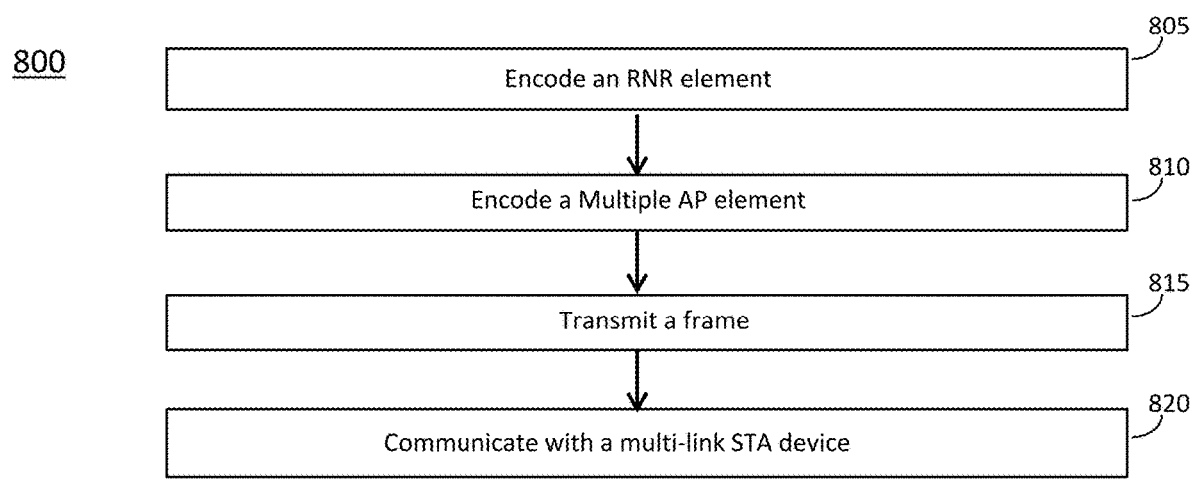
FIG. 8 illustrates the operation of a method in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In descriptions of the method 800, reference may be made to one or more figures, although it is understood that the method 800 may be practiced with any other suitable systems, interfaces and components.

In some embodiments, a multi-link AP device 510 may perform one or more operations of the method 800, but embodiments are not limited to performance of the method 800 and/or operations of it by the multi-link AP device 510. In some embodiments, another device and/or component may perform one or more operations that may be the same as, similar to and/or reciprocal to one or more operations of the method 800. In another non-limiting example, the AP 502 may perform one or more operations that may be the same as, similar to, reciprocal to and/or related to one or more operations of the method 800, in some embodiments. In another non-limiting example, the multi-link STA device 520 may perform one or more operations that may be the same as, similar to, reciprocal to and/or related to one or more operations of the method 800, in some embodiments. In another non-limiting example, the STA 504 may perform one or more operations that may be the same as, similar to, reciprocal to and/or related to one or more operations of the method 800, in some embodiments. In another non-limiting example, another device may perform one or more operations that may be the same as, similar to, reciprocal to and/or related to one or more operations of the method 800, in some embodiments.

The method 800 and other methods described herein may refer to APs 502, STAs 504, multi-link AP devices 510, multi-link AP devices 510, multi-link devices and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the method 800 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the method 800 and/or other method described herein may also be applicable to an apparatus of an AP 502, an apparatus of a STA 504, an apparatus of a multi-link AP device 510, an apparatus of a multi-link STA device 520, an apparatus of a multi-link device and/or an apparatus of another device. In some embodiments, an apparatus of a multi-link AP device 510 may perform one or more operations of the method 800 and/or other operations. In some embodiments, an apparatus of an AP 502 may perform one or more operations of the method 800 and/or other operations. In some embodiments, an apparatus of a multi-link STA device 520 may perform one or more operations of the method 800 and/or other operations. In some embodiments, an apparatus of a STA 504 may perform one or more operations of the method 800 and/or other operations.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards. In some embodiments, the AP 502, STA 504, multi-link AP device 510, multi-link STA device 520, multi-link device and/or other device may be configured to operate in accordance with an EHT protocol and/or EHT technique(s).

At operation 805, the multi-link AP device 510 may encode an reduced neighbor report (RNR) element. At operation 810, the multi-link AP device 510 may encode one or more Multiple AP elements. At operation 815, the multi-link AP device 510 may transmit a frame. At operation 820, the multi-link AP device 510 may communicate with a multi-link STA device 520.

In some embodiments, the multi-link AP device 510 may comprise multiple APs 502. The multi-link AP device 510 may be configured for multi-link communication on a plurality of channels. For each channel of the plurality of channels, at least one of the APs 502 of the multi-link AP device 510 may be configured for communication on the channel. The multi-link AP device 510 may encode a frame for transmission by one of the APs 502 of the multi-link AP device 510. The multi-link AP device 510 may encode the frame to include signaling to enable multi-link discovery of the APs 502 of the multi-link AP device 510. The multi-link AP device 510 may encode the signaling to include one or more of: a reduced neighbor report (RNR) element that identifies the APs 502 of the multi-link AP device 510; a multiple AP element; and/or other element(s). The multiple AP element may be configurable to include one or more of: common information for the APs 502 of the multi-link AP device 510; per-AP sub-elements that include per-AP information related to the APs 502 of the multi-link AP device 510; and/or other element(s).

In some embodiments, the per-AP information may be related to one or more policies of the APs 502 of the multi-link AP device 510. In some embodiments, the policies may be related to one or more of: initiation of a multi-link association with the multi-link AP 510 by a multi-link STA device 520 that discovers the multi-link AP device 510; exchange of management frames and power save negotiation frames between the multi-link STA device 520 and the multi-link AP device 510; interfaces for data exchange between the multi-link STA device 520 and the multi-link AP device 510; reception of traffic indication map (TIM) information or target wake time (TWTT) information by a multi-link STA device 520 that discovers the multi-link AP device 510; reception of broadcast traffic or multi-cast traffic by the multi-link STA device 520; whether a transition of one or more traffic IDs (TIDs) between channels is decided by the multi-link AP device 510 or is negotiated between the multi-link AP device and a multi-link STA device 520 that discovers the multi-link AP device 510; and/or other.

In some embodiments, the multi-link AP device 510 may encode the RNR element to indicate whether the APs 502 are part of the multi-link AP device 510. In some embodiments, the multi-link AP device 510 may encode each of the per-AP sub-elements to indicate whether inheritance of information in the per-AP sub-elements is to be used in the multi-link discovery. In some embodiments, the multi-link AP device 510 may encode the per-AP sub-elements to include one or more enhanced distributed channel access (EDCA) parameters. In some embodiments, the multi-link AP device 510 may encode the common information to include a medium access control (MAC) service access point (SAP) address of the multi-link AP device 510. In some embodiments, the multi-link AP device 510 may encode the common information to include information related to shared buffer capabilities of the APs 502 of the multi-link AP device 510.

In some embodiments, the multi-link AP device 510 may encode the RNR element to include, for each of the channels of the plurality of channels, one or more of: a neighbor AP information field that includes an operating class of the channel and a channel number; and/or other.

In some embodiments, the multi-link AP device 510 may encode the RNR element to include, for each of the neighbor AP information fields, for each of the APs 502 operating on the channel corresponding to the neighbor AP information field, one or more of: a target beacon transmission time (TBTT) information field that includes a TBTT offset of the AP 502.

In some embodiments, the multi-link AP device 510 may encode each of the TBTT information fields to indicate one or more of: whether the AP 502 corresponding to the TBTT information field is part of the multi-link AP device 510; a corresponding AP ID; and/or other.

In some embodiments, the frame may be one or more of: a beacon frame, a probe response frame and/or other frame.

In some embodiments, the APs 502 of the multi-link AP device 510 share a common medium access control (MAC) service access point (SAP) address to a logical link control (LLC) entity of the multi-link AP device 510.

In some embodiments, the channels may be included in one or more of: a frequency band in a 2.4 giga-Hertz (GHz) range; a frequency band in a 5 GHz range; a frequency band in a 6 GHz range; and/or other frequency band(s). In some embodiments, at least two of the channels may be in different frequency bands.

In some embodiments, a method may include encoding a frame for transmission, wherein the frame is encoded to include signaling to enable multi-link discovery of multiple APs 502 of a multi-link AP device 510 operating in a plurality of channels. In some embodiments, the signaling may be encoded to include one or more of: A) a reduced neighbor report (RNR) element that identifies the APs 502 of the multi-link AP device 510; B) a multiple AP element; and/or C) other element(s). In some embodiments, the multiple AP element may be configurable to include one or more of: common information for the APs 502 of the multi-link AP device 510; per-AP sub-elements that include per-AP information related to the APs 502 of the multi-link AP device 510; and/or other element(s).

In some embodiments, a multi-link STA device 520 may comprise multiple STAs 504. The multi-link STA device 504 may be configured for multi-link communication on a plurality of channels. For each channel of the plurality of channels, at least one of the STAs 504 of the multi-link STA device 520 may be configured for communication on the channel. In some embodiments, the multi-link STA device 520 may decode a frame from an AP 502 of a multi-link AP device 510 comprising multiple APs 502. In some embodiments, the frame may include signaling for multi-link discovery of the APs 502 of the multi-link AP device 510. In some embodiments, the signaling may include one or more of: a reduced neighbor report (RNR) element that identifies the APs 502 of the multi-link AP device 510; a multiple AP element; and/or other element(s). In some embodiments, the multiple AP element may be configurable to include one or more of: common information for the APs 502 of the multi-link AP device 510; per-AP sub-elements; and/or other element(s). In some embodiments, the per-AP sub-elements may include one or more of: information related to policies of the APs 502 of the multi-link AP device 510; and/or other element(s).

In some embodiments, if a corresponding per-AP sub-element for one of the APs 502 of the multi-link AP device 510 does not include one or more operating parameters, the multi-link STA device 504 may determine values for the one or more operating parameters based on an inheritance of previous values of the one or more operating parameters.

In some embodiments, the multi-link STA device 504 may determine one or more operating parameters of one of the APs 502 of the multi-link AP device 510 based on an inheritance indicator included in the per-AP sub-element corresponding to the AP 502. In some embodiments, the multi-link STA device 504 may, if the inheritance indicator indicates that an inheritance is to be used, determine values of the one or more operating parameters based on previous values of the one or more operating parameters. In some embodiments, the multi-link STA device 504 may, if the inheritance indicator indicates that the inheritance is not to be used, determine values of the one or more operating parameters based on values included in the per-AP sub-element.

In some embodiments, an apparatus of a multi-link AP device 510 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

Figure 12:
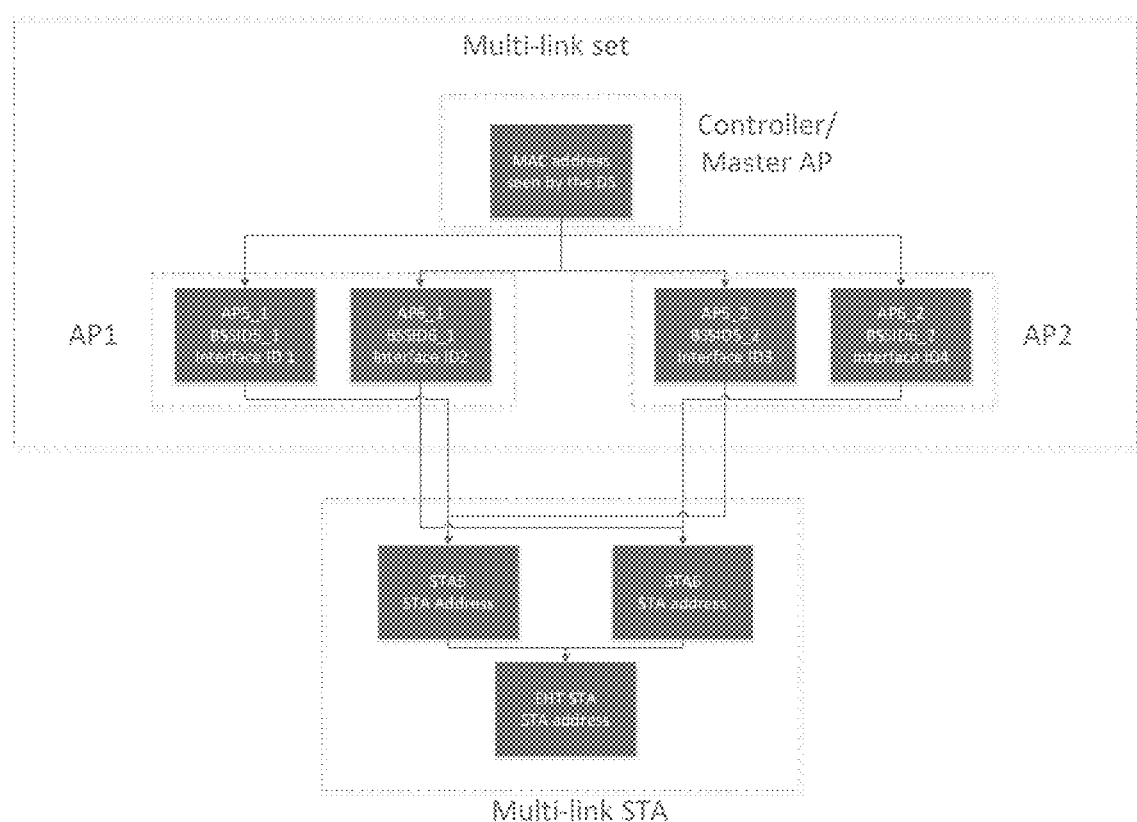
FIG. 12 illustrates an example multi-link device in accordance with some embodiments.
Figure 13:
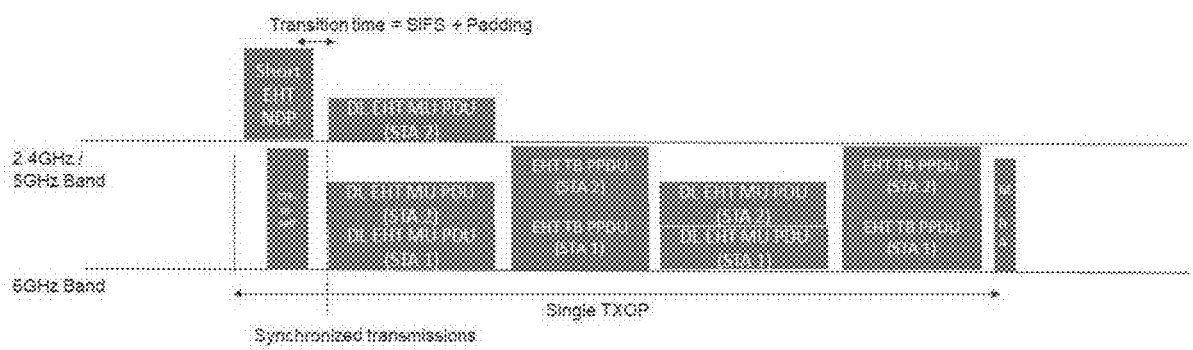
FIG. 13 illustrates example elements in accordance with some embodiments.
Figure 14:
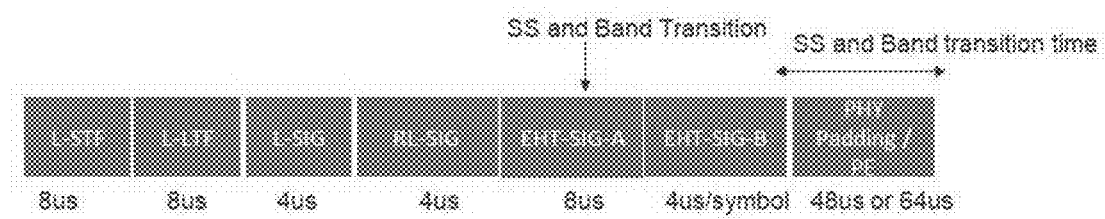
FIG. 14 illustrates an example element in accordance with some embodiments.
Figure 15:
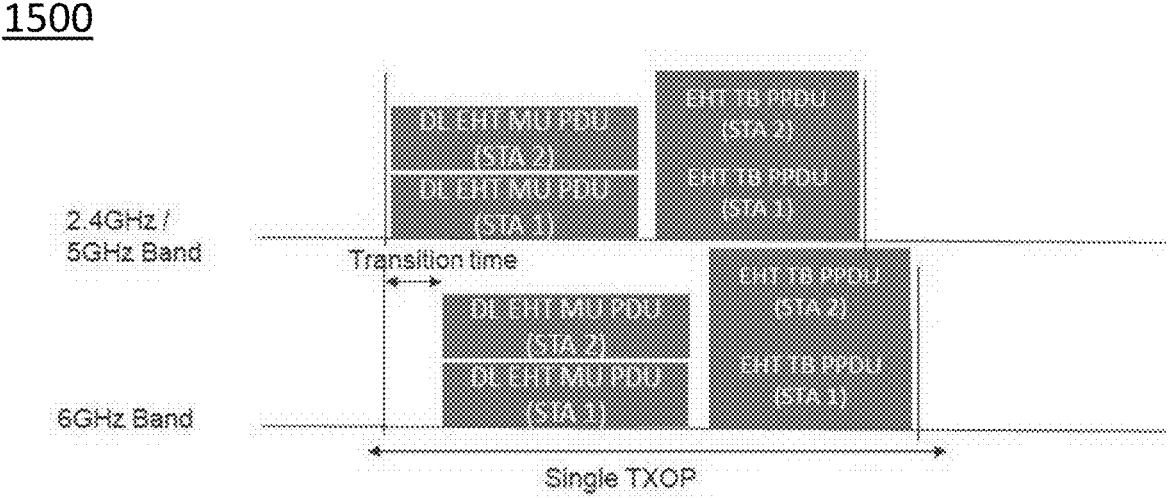
FIG. 15 illustrates example elements in accordance with some embodiments.
Figure 16:
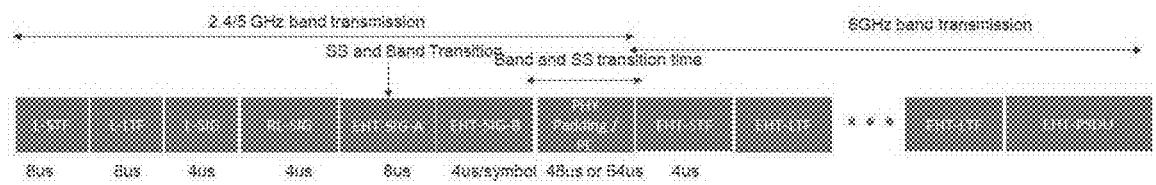
FIG. 16 illustrates an example element in accordance with some embodiments.
Figure 17:
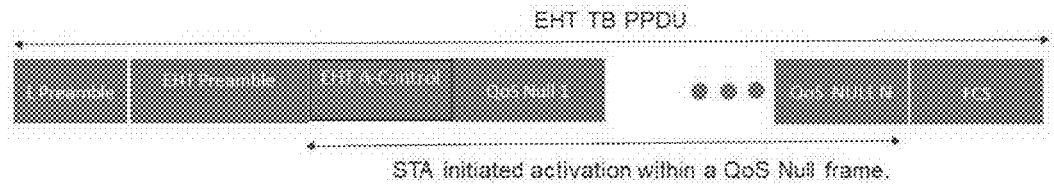
FIG. 17 illustrates an example element in accordance with some embodiments.
Figure 18:
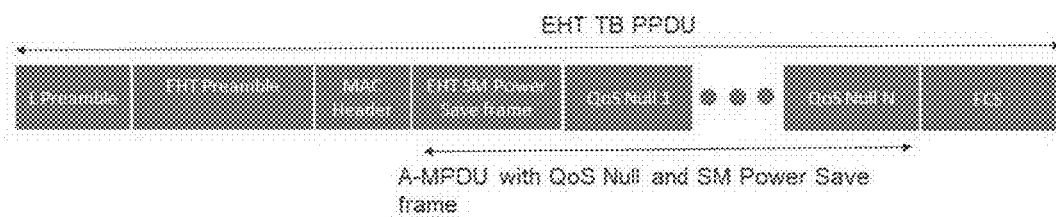
FIG. 18 illustrates an example element in accordance with some embodiments.
Figure 19:
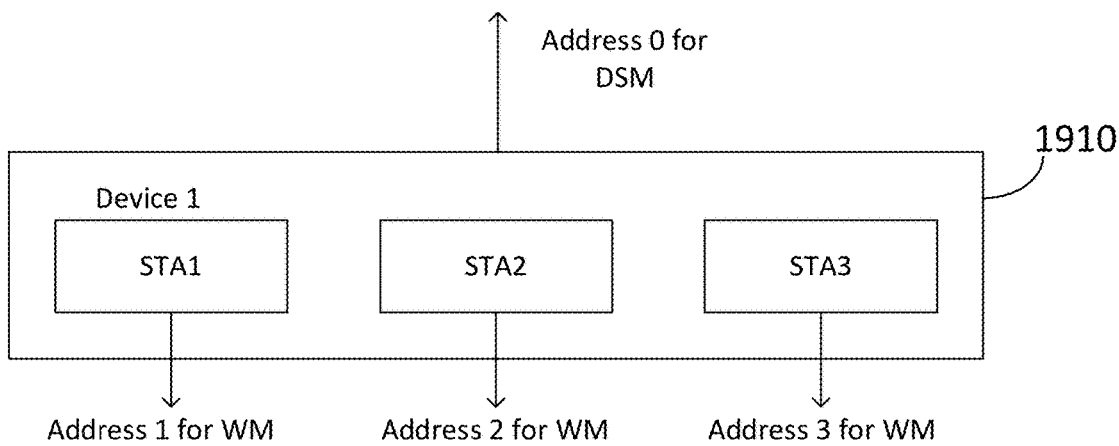
FIG. 19 illustrates an example multi-link device in accordance with some embodiments.
Figure 21:
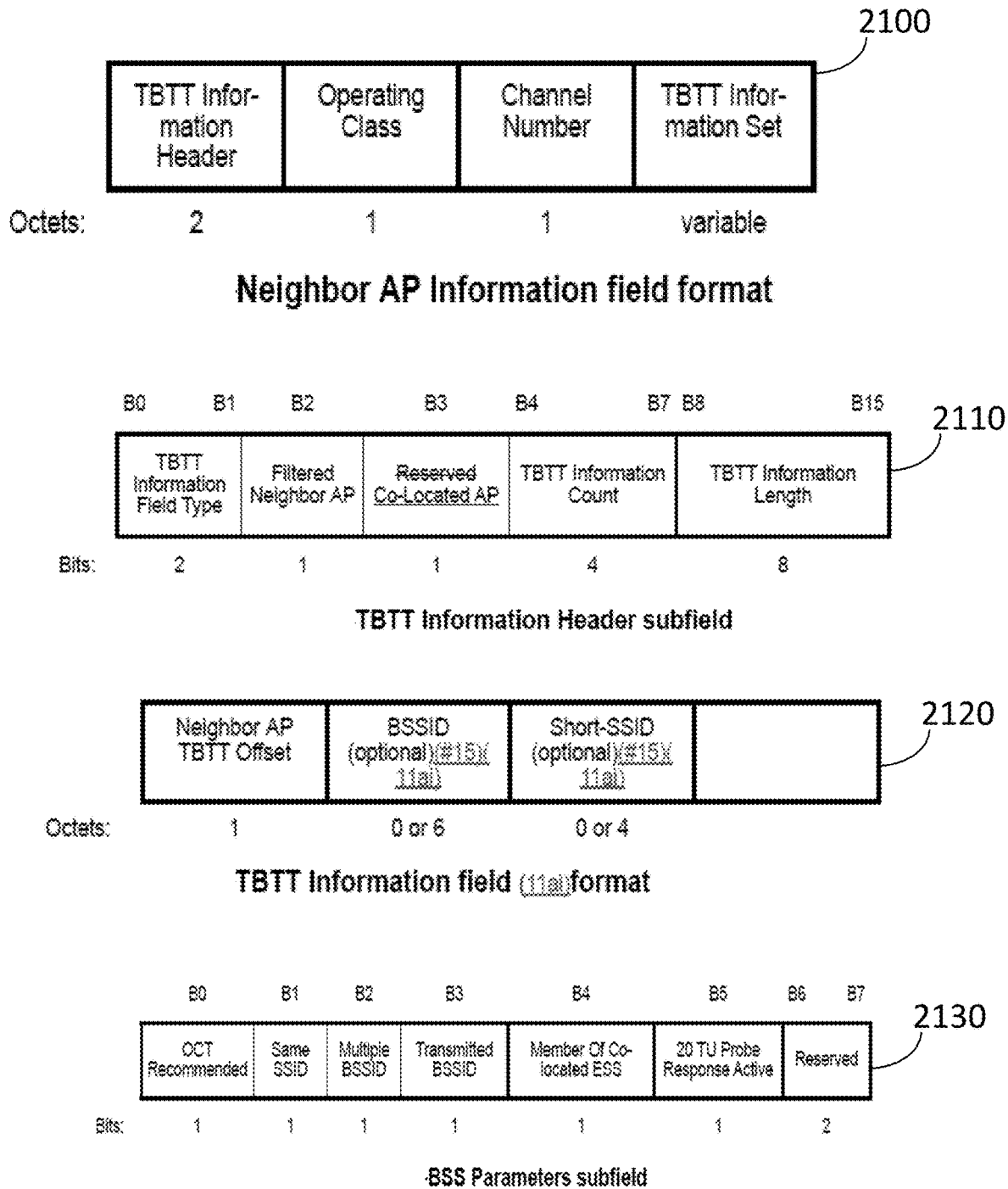
FIG. 21 illustrates example elements in accordance with some embodiments.
Figure 23:
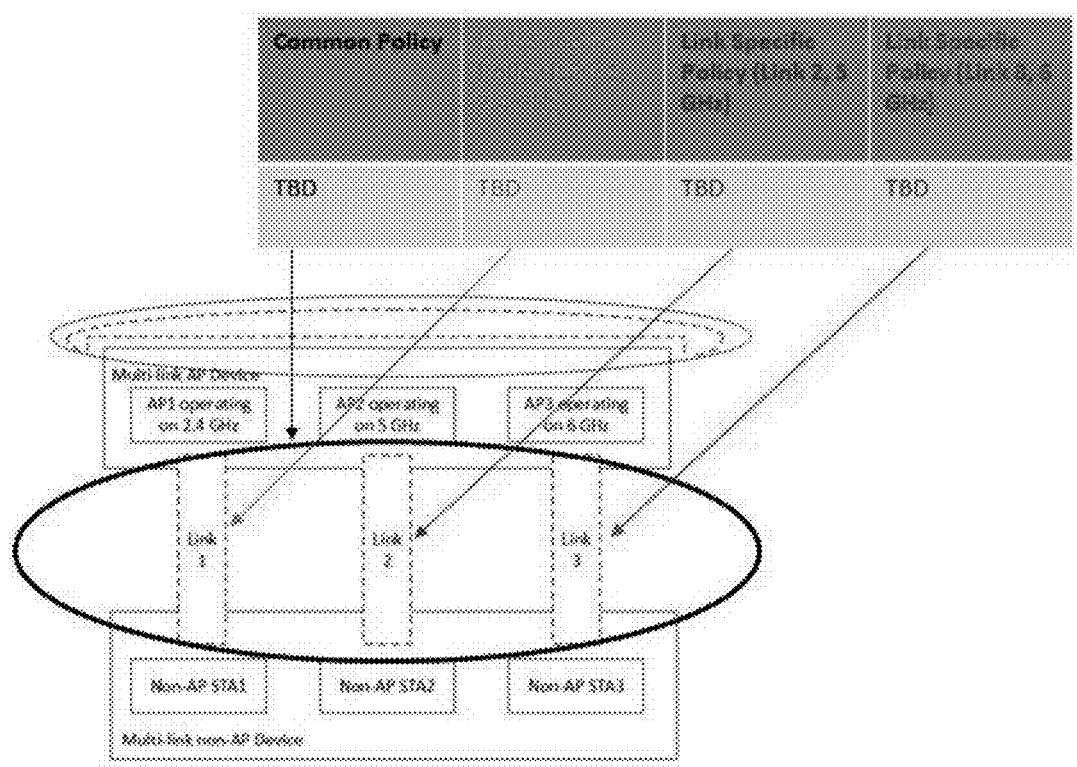
FIG. 23 illustrates an example scenario in accordance with some embodiments.

FIG. 9 illustrates an example multi-band operation in accordance with some embodiments. FIG. 10 illustrates example operations in accordance with some embodiments. FIG. 11 illustrates example scenarios in accordance with some embodiments. FIG. 12 illustrates an example multi-link device in accordance with some embodiments. FIG. 13 illustrates example elements in accordance with some embodiments. FIG. 14 illustrates an example element in accordance with some embodiments. FIG. 15 illustrates example elements in accordance with some embodiments. FIG. 16 illustrates an example element in accordance with some embodiments. FIG. 17 illustrates an example element in accordance with some embodiments. FIG. 18 illustrates an example element in accordance with some embodiments. FIG. 19 illustrates an example multi-link device in accordance with some embodiments. FIG. 20 illustrates example scenarios in accordance with some embodiments. FIG. 21 illustrates example elements in accordance with some embodiments. FIG. 22 illustrates example elements in accordance with some embodiments. FIG. 23 illustrates an example scenario in accordance with some embodiments.

It should be noted that the examples shown in FIGS. 9-23 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-23. Although some of the elements shown in the examples of FIGS. 9-23 may be included in a WLAN standard, Wi-Fi standard, 802.11 standard, and/or other standard, embodiments are not limited to usage of such elements that are included in standards.

Some embodiments may be related to extended Spatial Multiplexing and Multi-band Power Save for EHT. In some embodiments, an Extended Spatial Multiplexing and Multi-band Power Save protocol for EHT may be used. In some embodiments, an enhanced power save protocol considering both spatial multiplexing and multi-band operations may be used. Such embodiments may be related to features of future EHT STAs 504, although the scope of embodiments is not limited in this respect. Since EHT STAs 504 may be equipped with multiple receive chains to support more than 2 spatial streams and multi-band operations, one or more of the techniques, operations and/or methods described herein may improve the power save for EHT STAs 504 in some cases.

In some embodiments, an indication field about number of spatial streams (SS) in each band may be used in one or more of the following frames: A) Trigger frame (User Info field); B) DL Data frames (A-Control, OMI); C) SM Power Save frame (SM Power Control field); and/or D) other. In the above, A) and B) may enable AP initiating behavior, that is, the AP 502 can inform the STAs 504 of whether the upcoming transmission will require STAs 504 to activate their multiple receive chains or activate multi-band operations.

In some embodiments, the STAs 504 may only activate its multiple receive chains and multi-band operations when necessary. That is, a STA 504 may only need to activate its multiple receive chains and/or multi-band operations if the Trigger or DL frames indicate the upcoming downlink transmission addressed to it will employ multiple spatial streams and/or multi-band. If not, the STA 504 can still operate in dynamic SM power save mode with only one receive chain in one band powered.

In the above, C) may enable the STA initiating behaviour. That is, the STA 504 can inform the AP 502 about how many receive chains it will activate in each band. This may enable the AP 502 to perform optimized scheduling as it knows the number of spatial streams activated in each band at the STA side. In FIG. 9, example flows of AP initiating (900) and STA initiating (950) are illustrated.

In some embodiments, for Trigger frame, there are at least two options to add the indication field. In one option, in Trigger Dependent User Info subfield of each User Info field within an MU-RTS Trigger frame, BSRP Trigger frame or BQRP Trigger frame, the field given in the tables below may be used. The tables below illustrate examples of SS Allocation and Multi-band Operation field format. In some embodiments, the SS Allocation in x GHz Band subfield indicates the number of downlink spatial streams in the next downlink transmission in x GHz band following the Trigger frame, and is set to the number of spatial streams minus 1.

| | SS Allocation and Multi-band Operation | | |
|---|---|---|---|
| Octets | 2 | | |
| SS Allocation in 2.4 GHz Band | SS Allocation in 5 GHz Band | SS Allocation in 6 GHz Band | Reserved |
| Bits 3 | 3 | 3 | 7 |

Another option may include reuse of the SS Allocation subfield within each User Info field in the MU-RTS Trigger frame. One or more of the following may be applicable: this subfield in BSRP and BQRP Trigger frame cannot be reused; there are only 6 bits in this field, so 2 bits for each band; and/or other. In some embodiments, for DL Data frames, a new SS Allocation and Multi-band Operation subfield in A-Control subfield may be used. In some embodiments, the subfield format may be the same as (or similar to) the tables given above.

In some embodiments, for SM Power Save frame, there are at least two options to add the indication field. One option may include addition of a new SS Allocation and Multi-band Operation field in SM Power Save frame with the same format (and/or similar format) as given in the tables above.

Another option may include usage of the 6 reserved bits in SM Power Control field within an SM Power Save to indicate the SS information in each band. Non-limiting examples are given in the tables below. The top table is for SM Power Save frame format, the second table is related to proposed changes to SM Power Save frame format).

| | SM Power Save Enabled | SM Mode | Reserved |
|---|---|---|---|
| Bits | 1 | 1 | 6 |

| | SM Power Save Enabled | SM Mode | SS Allocation in 2.4 GHz Band | SS Allocation in 5 GHz Band | SS Allocation in 6 GHz Band |
|---|---|---|---|---|---|
| Bits | 1 | 1 | 2 | 2 | 2 |

In some embodiments, another indication field about the activation duration of receive chains in each band may be used in one or more of the following frames: A) Trigger frame (MU-RTS, User Info field); B) DL Data frames (A-Control, OMI); C) SM Power Save frame (SM Power Control field); and/or D) other. In some embodiments, with this indication in A) and B), the STA 504 will not go back to SMPS if the AP 502 indicates it needs the STA 504 to stay in multiple receive chains for a period of time. In some embodiments, with this indication in C), the AP 502 can perform optimized scheduling as it knows the duration information of activated receive chains in each band at the STA side. In FIG. 10, non-limiting examples flows are shown for AP initiating (1000) and STA initiating (1050).

In some embodiments, for Trigger frame, there are at least two options to add the indication field. In one option, in Trigger Dependent User Info subfield of each User Info field within an MU-RTS Trigger frame, BSRP Trigger frame or BQRP Trigger frame, the field in the table below may be used. The table below illustrates a proposed Multiple Rx Chains Operation Duration field format. The Multiple Rx Chains Operation Duration subfield indicates the effective duration of the corresponding SS Allocation and Multi-band Operation subfield shown in the corresponding tables (for SS Allocation and Multi-band Operation) above.

| | Multiple Rx Chains Operation Duration |
|---|---|
| Octets | TBD |

Another option may include reusage of the More Data subfield in MU-RTS Trigger frame. In some embodiments, if the More Data subfield is set to 1, the STA 504 should keep activating its multiple Rx chains. In some cases, the More Data subfield in the MU-RTS Trigger frame is for all STAs 504, so may not be able to deliver the duration information individually to each STA 504. In some cases, the method cannot explicitly indicates the duration. That is, it only serves as an implicit indication of the effective duration, for example, the effective duration is to the end of the current TXOP.

In some embodiments, for DL Data frames, there are at least two options to add the indication field. One option may include usage of a new Multiple Rx Chains Operation Duration subfield in A-Control subfield. The subfield format may be the same as (and/or similar to) the format shown in the table above (for Multiple Rx Chains Operation Duration field format). Another option may include reusage of the More Data subfield in the DL data frames.

In some embodiments, for SM Power Save frame, the indication field may be added. One option may include addition of a new Multiple Rx Chains Operation Duration field in SM Power Save frame with the same format (and/or similar format) as shown in the table above (for Multiple Rx Chains Operation Duration field format).

Some embodiments may be related to multi-band policy framework. Some embodiments may be related to multi-band in EHT. Some embodiments may be related to one or more use cases for multi-band operation, including but not limited to: STA 504 seamless and lossless transition between links/bands, STA 504 operation on multiple links/bands with different TIDs on different links/bands, STA 504 operation on multiple links/bands with aggregation for the same TID). Such use cases may be applicable whether the STA 504 is a single radio device or a multi-radio device, whether the APs 502 have the same or different MAC addresses, are co-located or non-co-located.

Some embodiments may be related to one or more of the following concepts, for which non-limiting examples are shown in 550 in FIG. 5. A Multi-link AP Set 560 is a set of APs 502 which may or may not be collocated. The APs 502 that are a member of a Multi-link AP set 560 could be a subset of the APs 502 that form an ESS. All APs 502 in a Multi-link AP set 560 may share a virtual, single MAC SAP. The multi-link AP set 560 may be identified by this virtual MAC address, or specific ID/MAC address. The APs 502 in the multi-link set 560 may be identified by their MAC address, operating class/channel, and/or other. A client device 570 may contain a set of collocated STAs 504.

On top of this framework a new association exchange, called multi-link association, between a client device 570 (non-AP multi-band/link device 570) and a Multi-link AP set 560 may be performed as follows: for each AP 502 in the Multi-link AP set 560, the client device 570 is reached by the corresponding non-AP STA 504 of the client device 570; for an AP 502 in the Multi-link AP set 560, each configuration of BSS info and the corresponding non-AP STA info of the client device 570 is viewed as an link; exchange capability for different links so that, on each or some of these links, the STA 504 reaches something equivalent to Association state 3 (wherein the STA 504 can exchange class 3 frames with the corresponding AP 502, and gets an AID); for the DS, the APs 502 in the Multi-link AP set 560 serve the client device. In other words, all the APs 502 may be seen as a virtual AP with a single MAC SAP for the Multi-link AP set 560.

In some embodiments, a Multi-link AP set 560 is advertised and can be discovered with an element in beacons, probe responses sent by an AP 502 of the multi-link AP set 560. As part of the multi-link association, association (as currently defined in 802.11) between some of the APs 502 of the multi-link AP set 560 and the corresponding STAs 504 in the non-AP multi-link device 570 cause these STAs 504 to become associated (it could be all APs 502/STAs 504 in the Multi-link AP set 560/Client device 570 or only some of them). Alternatively, the multi-link association could be done as part of a second phase of association once the multi-link association is performed. Alternatively, the multi-link association could be done after a first association to one of the APs 502 in the multi-link AP set 560.

Following association, RNSA can be performed per link, or can be done jointly for multiple links as part of a multi-link RSNA. Once that is done, data transfer can happen on each link, each link can be activated/deactivated, data plane can be moved from one link to another or can be spread across multiple links, all in a transparent way to the upper layers (single MAC SAP to the DS), and with data continuity if the buffers are shared between the STAs 504 in the non-AP multi-link device 570, and between the APs 502 in the Multi-link AP set 560.

Some embodiments may be related to STA mobility with non-collocated APs 502, which may include one or more of: ability to define a set of a very large number of APs 502; ability to add/remove APs 502 from the multi-link association when the STA 504 is moving; handling of link IDs; and/or other.

Some embodiments may be related to expansion of the multi-link framework for multiple APs 502 that are either co-located or not co-located, in order to manage seamless mobility from client devices 570 that are Multi-link associated with a multi-link AP set 560. In some embodiments, the multi-link AP set 560 can be defined to include some or all of the APs 502 from an ESS (that have the same SSID and that are usually managed by the same wireless controller). Because of this, the multi-link AP set 560 can be made of a very large number of APs 502 in venues like stadiums for instance. It is possible that each AP 502 advertises all the APs 502 that are part of the same multi-link AP set 560, but that would take too much overhead in beacons and probe responses from the different APs 502. In some embodiments, when the multi-link AP set 560 is advertised by an AP 502 in its beacons/probes, and that the AP 502 can choose a subset of the APs 502 in the multi-link AP set 560 to be advertised.

In some embodiments, a STA 504 in a client device 570 can do a multi-link association with a multi-link AP set 560 by communicating with one of the AP 502 that advertised the multi-link AP set 560 (note that the multi-link AP set 560 can be identified by a MAC address or a multi-link set ID, or other means). To do this, a STA 504 of the client device 570 sends a Multi-link association request frame to the AP 502. This request contains an element describing the other STAs 504 that are part of the client device 570, which can be a multi-link or multi-band element, and can also include the number of links that the client device 570 can maintain at the same time (links: link between a non-AP STA 504 from a client device 570 and an AP 502 from a multi-link AP set 560). To maintain an link simply means that the STA 504 keeps the context for exchanging with the AP 502 on this link (MAC addresses, AID, security if needed, negotiations, and/or other even if it is not actually using this link.

The AP 502 responds to this request with a multi-link association response frame that includes the parameters of the Multi-link AP set 560 (multi-link policy, multi-link capabilities, ability to share buffers, and/or other) and the list of APs 502 (each corresponding to an link with the STA 504) that are part of the multi-link AP set 560 and for which the corresponding STA 504 of the client device 570 will be automatically associated (in 802.11 terms). For each AP 502, this frame will carry (of the AP 502), one or more of: the BSSID, operating class and channel, operation elements, capabilities, and/or other. Each link between a non-AP STA 504 of the client device 570 and an AP 502 from the multi-link AP set 560 will receive a link ID that can be used later in order to establish the multi-link policy, and to transition from one link to the other. Each link for which the STA 504 is associated to the AP 502 is called for instance an enabled link.

In some embodiments, an AID is also assigned to the STA 504 for a particular link in the multi-link association response. Alternatively, if the AID is not assigned in the multi-link association response, the link can be enabled without AID assignment. In order for the link to be fully activated, there would be a need for a frame exchange between the STA 504 and the AP 502 (in-band or out-of-band) to transition the link from enabled to activated and where the AID assignment would be performed.

In some embodiment, if 2 APs 502 are transparent (have the same MAC address, or possibly other conditions, similarly to transparent FST) that would mean that the 2 APs 502 are sharing the association states and that the same AID would be used for the STA 504 on all the APs 502 that have the same MAC address. Once this is achieved, the STA 504 will be able to perform multi-link RSNA in order to establish security with all the APs 502 to which a STA 504 of the client device 570 is associated.

In some embodiments may be related to enabling more links or disabling links. Some embodiments may include addition of an enabled link or to disable a previously enabled link, by a 2-way frame exchange between the STA 504 and the AP 502 or by a one-way exchange between the AP 502 and the STA 504. In some embodiments, a Multi-link association update request and response frame (or 2 different set of frames: multi-link association enablement frames and multi-link association disablement frames if we want to separate the functionalities to enable or disable links) may be used. In some embodiments, the STA 504 can initiate the update by sending a request, and can include in the request the indication of the AP 502 that it wants to add or remove (corresponding link becoming enabled or disabled). In some embodiments, the AP 502 responds with the response (or sends an unsolicited response) that include the new link (including the ID) and all the information on the AP 502 so that the STA 504 can operate on this link. Following this exchange, a multi-link RSNA update can be performed.

Some embodiments may be related to handling a large number of link IDs. In some embodiments, an ESS can have a very large number of APs 502 in the order of hundreds of APs 502. If the ESS assigns a unique linkID to all APs 502, the number of link ID will be equally large. The benefit of using an link ID is to have the possibility to use this as a short indicator of link instead of, for example, using the BSSID of the corresponding AP 502; this allows to differentiate 2 links with 2 APs 502 having the same BSSID.

In some embodiments, the Link ID field is expected to be used in many frames or elements in order to manage operation across links. For instance, for transitioning some TID data flow to one link to the other, or to negotiate a TWT SP in a particular link, an link ID field could be used. It is expected that for such frames/elements, an link ID bitmap will also be used in order to indicate more than one link (example: a TID that is spread across multiple links for aggregation).

Some embodiments may be related to solutions so that this field does not become too large. Some embodiments may be related to management of link IDs differently for each STA 504. The ID of the link can be different from one STA 504 to the other. Each STA 504 has link IDs from 0 to the total number of enabled links. When suppressing one, the link IDs may be shifted/changed. With this approach, the STA 504 just has to do the mapping between the link ID and the corresponding AP 502. But the APs 502 have to have a possibly different mapping between the link ID and the APs 502 depending on each STA 504. For instance, if STA1 has link enabled with AP1 and AP2 (AP1 link is link 0 and AP2 is link 1) and if STA2 has link enabled with AP2 and AP3 (AP2 link is link 0 and AP3 is link 1 for STA2).

In some embodiments, the link ID may be kept linked to one AP 502, but handle the signaling of the linkID field in order to keep the field small. For instance, a STA 504 can be multi-link associated with a stadium ESS and have link enabled with ID 175, 176 and 177. The linkID field can be the LSB of the complete linkID. Note that by doing so, the AP 502 also has to have in memory the MSB of the linkIDs for each STA 504. The linkID bitmap can also have each bit corresponding to the X LSBs of the linkID. Note that in such case, the MSBs can be included in a field that is sent along with the bitmap (basically corresponds to a bitmap with a starting link ID, with the first bit of the bitmap corresponding to the starting linkID, and bit 2 corresponding to the starting linkID+1, and so on).

Some embodiments may be related to behavior for a multi-link AP set 560. In the non-limiting example 1100 in FIG. 11, the multi-link AP set 1110 comprises 4 APs 504 that are not co-located (same band or different bands). The circles illustrate the coverage of the AP 504 located in its center. The STA 1105 is in the range of AP1 1112, receives a beacon or a probe response indicating the information on AP1 1112, and that AP1 1112 is part of a multi-link AP set 1110 for the corresponding SSID, and includes in the multi-link AP set 1110 container a description of the AP2 1114. The STA 1105 performs a multi-link association with the multi-link AP set of AP1 by sending a multi-link association request frame to AP1 1112. AP1 1112 responds with a multi-link association response that enables association to the STA 1105 of the client device to both AP1 1112 and AP2 1114, and provides all the information needed for a typical operation between an AP 502 and a STA 504 for each of the APs 502. It also assign an link ID to each AP 502 (link ID 1 and 2 in this case).

The STA 504 can also perform multi-link RSNA in order to get security credentials for all the links that are active (meaning that a STA 504 is associated). A non-limiting example 1150 in FIG. 11 illustrates this. The STA 1105 is mobile and gets to a point where it transitions seamlessly to AP2 1114, without having to do anything as the link is already enabled. As discussed before, the STA 1105 may just need to transition the link from enabled to activated/Wireless-Medium enabled, by having a frame exchange (either done on the link or out-of-band with another link), and an AID can be assigned to the STA 1105 with this frame exchange, if it was not already assigned. It now receives beacons/probes from AP2 1114 that advertise the same Multi-link AP set, but which include in its description both AP1 1112 and AP3 1116. The STA 1105 therefore discovers a new link that was not advertised by AP1 1112, because it was too far away. The STA 1105 or the AP can now initiate a multi-link association update (where an link can be removed or added—alternatively, there could be a procedure specifically to add an link and another one to suppress one link). This can be a request from the STA 1105 with a multi-link association update request frame that contains the list of APs that the STA 1105 want to add in his association (AP3 1116 in our example here), to which the AP2 1114 responds with a multi-link association update response that indicate the new list of APs to which the STA 1105 is associated and the new link IDs. Not that we propose also that the AP2 1114 can send an unsolicited multi-link association update response to unilaterally decide to update the multi-link association for the STA 1105. This can be followed by a multi-link RSNA update to also get the credentials for AP3 1116.

In FIG. 12, 1200 illustrates another deployment with 2 AP devices each operating 2 APs in 2 different bands.

Some embodiments may be related to Spatial Stream and Band Activation for Multi-band Operations for EHT. In some embodiments, in multi-band operation for EHT, depending on the capabilities of a STA 504, multi-band operations can be classified as two modes: A) concurrent multi-band operation, wherein a STA 504 is able to activate different bands and perform transmission and reception at more than one band simultaneously, or B) non-concurrent multi-band operation, wherein a STA 504 is able to operate in different bands, but it can only operate in one band at a time (that is, it cannot operate in more than one band simultaneously). For non-concurrent multi-band operation, a key problem is to how to enable the band switching operation for a STA 504. That is, how to enable the STA 504 to activate a different band and switch from current band to the different band. For concurrent multi-band operation, a key problem is to how to enable the band activation for a STA 504. That is, how to enable the STA 504 to activate a second band apart from its current band.

Some embodiments may be related to extension of a Spatial Multiplexing Power Save protocol to also include band activation signaling for better power save in terms of both spatial streams and bands. Two mechanisms are described herein, which may enable general spatial stream (SS) and multi-band transitions targeting normal multi-band operation. In addition, a scheme for TXOP-based SS and band activation or transition is also described herein.

Some embodiments may use multi-band operation signaling either in PHY preamble or in a newly defined Short NDP frame, so that inter-PPDU and intra-PPDU SS band switching/activation can be achieved to facilitate multi-band operation for either nonsynchronous (MAC aggregation) or synchronous (PHY aggregation) mode. In some embodiments, a scheme for TXOP-based SS and band activation or transition may be used.

Some embodiments may be related to inter-PPDU SS and Band Transition. In some embodiments, inter-PPDU band activation may be required when the AP 504 intends to perform frame exchanges in both bands concurrently. This activation within a single TXOP/SP is beneficial to achieve high throughput and also for STAs 504 with low latency applications and capable of dual band operation. In some embodiments, inter-PPDU transition may be required when the AP 502 intends to switch a STA 504 to another band completely and perform the frame exchange in that band. This transition is suitable for STAs 504 capable of single band operation.

In some embodiments, a Short EHT NDP frame may be used. A non-limiting example frame 1300 is illustrated in FIG. 14. In FIG. 14, an example Short EHT NDP format 1400 is shown. One or more of the following may be included in the frame 1300: L-STF, L-LTF, and/or L-SIG, used to protect against legacy transmissions; RL-SIG and/or EHT-SIG-A, which includes spatial stream and multi-band signaling, as well as the information about EHT-SIG-B (the EHT SIG-A may also identify this NDP as the one used for band switching as opposed to EHT NDPs used for channel measurement); a partial BSSID of the AP 502 in the EHT-SIG-A or any other field within the NDP frame, wherein the partial BSSID field is the compressed BSSID of the AP transmitting the NDP frame (for instance, the compression may be achieved either by a hashing function or by the 8-16 LSBs of the BSSID value, although the scope of embodiments is not limited in this respect); an extended PE/padding duration that accounts for the transition/activation time of the signaled second band (the padded duration keeps the current channel busy so that the current channel is still reserved); EHT-SIG-B, which includes information about set of STAs 504 making the spatial stream and band transition, and also includes the spatial stream and band transition indication in MU scenarios; and/or other. In some embodiments, the EHT-SIG-B field also signals the duration of activation/transition in the second band, after which the STAs 504 are permitted to switch back to the current channel of operation. In some embodiments, the frame 1400 does not include EHT-STF and EHT-LTF since channel acquisition or estimation will be conducted on a channel after band transition.

Some embodiments may include signaling of band activation/transition is defined in a short MAC frame as well. In this frame, the TA field comprises the BSSID of the AP 502 transmitting the frame and the RA could be broadcast or multicast based on the targeted set of STAs 504. In some embodiments, it is proposed to include a field in the frame that provides the band(s) for activation/transition and the duration of activation/transition in the second band, after which the STAs 504 are permitted to switch back to the current channel of operation.

FIG. 13 illustrates a timing diagram for an example of inter-PPD SS and band transition. FIG. 13 shows a general example of timing diagram and procedure flow for synchronized multi-band operation. In FIG. 13, STA 1 only supports non-concurrent multi-band operation, whereas STA 2 supports concurrent multi-band operation.

In some embodiments, a general process is as follows. Initially, the AP 502 and both STAs 504 are operating in 2.4/5 GHz band. The AP 502 sends a Short EHT NDP frame to initiate the SS and/or multi-band transition. STA 1 needs to switch to 6 GHz band for following data reception from the AP 502, while STA 2 needs to activate its 6 GHz band for following concurrent data reception in both 2.4/5 GHz band and 6 GHz band. Short EHT NDP is a PPDU with null PSDU. The multi-band activation/switching signaling in included in the Short EHT NDP frame. Once received and decoded, STA 2 switches to 6 GHz band. STA 1 keeps operating in 2.4/5 GHz band, and activates its 6 GHz band. Since activating 6 GHz band takes some time for both STA 1 and STA 2, padding in Short EHT NDP frame is needed to give enough time to STAs for band activation. Moreover, the padding also reserves the current 2.4/5 GHz channel during the activation time of the STA 504 in the 6 GHz band, so that other STAs 504 will not grab the 2.4/5 GHz band. Transmission to STAs 1 and 2 in 6 GHz band starts when both STAs 504 are active in that band. In case of PHY aggregation transmissions in both bands start concurrently. Note that if there is no STA 504 in 2.4/5 GHz band for the AP 502 to transmit to once STAs 1 and 2 switches to 6 GHz (e.g., when STA 2 is only capable of non-concurrent MB operations) the AP 502 may abandon the TXOP in 2.4/5 GHz band following the transmission of the short EHT NDP. Also, the NDP in this case may not have a packet extension field.

Some embodiments may be related to an intra-PPDU SS and Band Transition. FIG. 15 shows an example of timing diagram and procedure flow for unsynchronized multi-band operation. In FIG. 15, both STA 1 and STA 2 support concurrent multi-band operation. In some embodiments, a general process is as follows. Initially, the AP 502 and both STAs 504 are operating in 2.4/5 GHz band. The AP 502 starts a TXOP in the 2.4/5 GHz band and transmits an EHT MU PPDU in that band with signaling in EHT PHY preamble for 6 GHz band activation. Meanwhile the AP 502 also starts contending for channel access in 6 GHz independently. If the AP 502 is able to win the channel access in 6 GHz then it signals the STAs 1 and 2 to also start operating on the 6 GHz band by including some information in the preamble. FIG. 16 shows an example 1600 in which this information is contained in the EHT SIG-A and SIG-B. In general the AP 502 may also include this information in a mid-amble in the middle of an ongoing transmission in the 2.4/5 GHz band (i.e., preemption of an ongoing transmission). While the AP 502 is waiting for STAs 504 to become active in 6 GHz band the AP 502 may use one or more of the following options to retain access to the medium in 6 GHz band: the AP 502 may keep transmitting to other users that are already active in the 6 GHz band; the AP 502 may transmit some legacy Control frame (e.g., CTS-to-self) in the 6 GHz band covering the duration of the TXOP in 6 GHz band; the AP 502 may start transmitting a MU PPDU to STAs 1 and 2 such that the fields following the EHT SIG-A in that PPDU are transmitted once the STAs 504 have activated their 6 GHz band; and/or other. In some embodiments, for unsynchronized multi-band operation, AP transmits an EHT MU PPDU in 6 GHz band once the STAs are active in 6 GHz band.

The proposed EHT MU PPDU format in FIG. 15 is as shown in FIG. 16. The SS and Band Transition indication is included in EHT-SIG-A. Additional padding or Packet Extension need to be added after EHT-SIG-B or included at the end of EHT-SIG-B prior to EHT-STF to give enough time for STAs 504 for SS and Band transition. Alternately, the EHT SIG-B may contain dummy or duplicate data to cover the PHY Padding/PE duration in FIG. 16.

Some embodiments may be related to A-MPDU aggregation with SM Power Save frame or OMI for TXOP-based SS and band activation/transition. Some embodiments may include addition of SS and band activation/transition signaling in SM Power Save frame or EHT A-Control field. In some embodiments, it is further proposed to aggregate the SM Power Save frame or EHT A-Control field with A-MPDU such that the signaling can be carried in a PPDU. If the EHT A-Control field is aggregated in an A-MPDU. The modified/EHT A-Control field sub-variant inside a QoS Null/Data frame may include information about one or more of: OM parameters for a band (same or different); time for which this OM parameter set is valid (maybe long term or for specified duration); and/or other.

In some embodiments, the SM Power Save frame is aggregated in an A-MPDU. The SM Power Save frame inside a QoS Null/Data frame may include information about one or more of: OM parameters for a band (same or different); time for which this OM parameter set is valid (maybe long term or for specified duration); and/or other. In some embodiments, if aggregated, SM Power Save frame to be the first in the set of MPDUs within an A-MPDU.

FIGS. 17 and 18 illustrate examples where the EHT A-Control field and SM Power Save frame are aggregated in an EHT TB PPDU, respectively. In FIG. 17, the EHT A-Control field is aggregated in EHT TB PPDU. In FIG. 18, SM Power Save frame is aggregated in EHT TB PPDU. The EHT A-Control field or SM Power Save frame will include the signaling information about SS and band activation.

Some embodiments may be related to multi-band policy framework. Some embodiments may be related to a new association exchange called multi-link association or multi-interface association between a non-AP device 570 (non-AP multi-band/interface device) and a Multi-link Set 560, which may include one or more of the following: for each BSS in the set, the non-AP device 570 is reached by a non-AP STA 504; for a BSS in the set, each configuration of BSS info and the corresponding non-AP STA 504 info of the non-AP device 570 is viewed as an interface; exchanging of capability for different interfaces is performed; for DS, the APs 502 in the set serve the non-AP device 570 (single MAC SAP in the Multi-link Set 560); and/or other.

In some embodiments, a multi-link Set 560 is advertised and can be discovered with an element in beacons, probe responses sent by an AP 502 of the multi-link set 560. As part of the multi-link association, association (as currently defined in 802.11) between some of the APs 502 of the multi-link set 560 and the corresponding STAs 504 in the non-AP multi-link device 570 become associated (it could be all APs 502/STAs 504 in the Multi-link Set 560/Non-AP device 570 or only some of them). Alternatively, that could be done as part of a second phase of association once the multi-link association is performed. With this 802.11 association, each corresponding STA 504/APs 502 exchange their capabilities, each STA 504 joins the corresponding BSS and gets assigned an AID. Following this, RNSA can be performed per link/interface, or can be done jointly for multiple links as part of a multi-interface/multi-link RSNA. Once that is done, data transfer can happen on each link, each link can be activated/deactivated, data plane can be moved from one interface to another or can be spread across multiple interfaces, all in a transparent way to the upper layers (single MAC SAP to the DS), and with data continuity if the buffers are shared between the STAs 504 in the non-AP multi-link device 570, and between the APs 502 in the Multi-link Set 560. Once this is done the problem that we want to resolve is the following: what is the policy for the operation across multi-links, meaning: who decides when/how to transition the STA 504 from one band to the other (a TID from one interface to the other), is it the AP 502 or the STA 504; which interface can be used for management/control plane (all interfaces or only some); and/or other.

Some embodiments may be related to an element, called multi-link set 560 policy for instance, and that is included in the discovery element or frame (beacon/probe responses, FILS DF, possibly neighbor reports, and/or other). This multi-link-set 560 policy defines the rules that the multi-link set 560 decides to apply regarding data and management/control plane, and that the STA 504 need to comply with. Pre-association management plane rules: can a STA 504 initiates a multi-link association on any interface (through any AP 502), or can it do it only with some APs 502/bands. Post-association management plane rules may be related to one or more of the following: A) Can STA 504/AP 502 exchange management frames and power save negotiation frame on any interface (through any AP 502), or can it do it only with some APs 502/bands. B) Are there restrictions on pre-association frame exchanges (only during certain periods, power control, and/or other). C) If not all the interfaces can be used, is it the AP 502 that is the only one that can decide which interface it is, or can the STA 504 make this change as it wishes, or can this interface be the same as the one used by the data plane all the time and follows the transitions.

In some embodiments, beacon information may be related to the following. Can STA 504 always find its relevant information in the beacon transmitted on the interface where the data plane is (for instance the TIM element, or a broadcast TWT), or is that always found only in one interface.

In some embodiments, broadcast delivery rules may be related to the following. Can the STA 504 receive broadcast/multicast traffic on any bands (the same information), or can it receive it only on some interface (anchor interface). And is the multicast/broadcast traffic always sent with broadcast frames, or can it be converted into unicast frames an transmitted on any interfaces.

In some embodiments, data plane rules may be related to the following. Can the STA 504 moves its TID(s) from one interface to the other as it wishes, or is the transition always an AP 502 decision that the STA 504 as to follow.

In the following, for simplicity, we consider a multi-link set 560 of 2 APs 502 operating at 5 and 6 GHz, and a non-AP multi-link device 570 capable of operating at 5 and 6 GHz. But this invention can be applied to any number of links.

Some embodiments may be related to data plane TID transitions policy. This describes the rules for transitioning a TID or all TIDs from one interface/band to the other or to both. We see 2 possible modes: A) a strong use case for this mode is if the AP 502 wants to do load balancing and fully control it, B) TID transition is an AP-only decision, based on a signaling from the AP 502 to the STA 504 that is either unicasted to the STA 504 or is broadcasted as an information for all STAs 504 or a subset of STAs 504. In B) above, one or more of the following may be applicable: under this mode, the AP 502 shall respect the constraints that the STA 504 has provided the AP 502 with, meaning, for instance, whether it can operate on multiple bands simultaneously or not. Example, if the STA 504 is single radio, the AP 502 can not transition a TID on 2 bands simultaneously (at the same time); signaling for TID transition can be in an A-Ctrl field, in a frame, in a PHY-generic specific container, if unicasted to a STA 504. It can be in a form of bitmap if it is multicast or broadcasted to multiple STAs 504; there could be 2 sub-modes: one where the request for transition is unsolicited and transmitted by the AP 502 to the STA(s) 504, one other where the STA 504 would solicit a transition, and the AP 502 can confirm it by sending the transition response.

In some embodiments, TID transition is open to all. Under this mode, the AP 502 can decide to move the TID of a STA 504 from one band to the other (or both), or the STA 504 can decide to move the TID from one band to the other (or both).

In some embodiments, TID transition is only STA-driven. A main use case is still load balancing (reduce latency, increase throughput, and/or other, or if the management plane is only on one band, but this could possibly be also for other justifications such as power save. Under this mode, the AP 502 can only suggest a transition, and the STA 504 is the only one deciding how/when to transition. The AP 502 may announce load conditions of the different bands (channel load) or available time periods in scheduled modes (e.g., the SPs that have not been reserved by the AP 502 for some other QoS STA 504). We can define a signaling from the STA 504 to the AP 502 (A-ctlr, OMI modification, frame, PHY signaling, and/or other) or we can consider that we just need an exchange in the new interface to signal the transition or the addition of a new interface to aggregation.

In some embodiments, TID transition is governed by a dynamic switching mechanism similar to the MU-EDCA parameter concept defined in EHT. In some embodiments, the AP 502 defines an interface that is used by default by the STA 504. In some embodiments, the AP 502 defines the trigger that will force a STA 504 to transition to another interface (explicit indication with signaling in a PHY or a MAC container, or implicit indication based on negotiation or standard rules (type of frame received, and/or other)), and the conditions for when to fall back to the default band/interface. Such mode could make sense when one band is used only for scheduled access for instance, (fully triggered—STA access), while the other one is used for EDCA. Similar to MU-EDCA, the STA 504 falls back naturally to the default band after signaling from the AP 502 that the AP 502 will stop scheduling in this band, or after a timeout.

Some embodiments may be related to pre-association management plane policy. This allows the multi-link set 560 to define which interface can be used for pre-association frame exchanges (probe request, authentication/association, multi-link association, and/or other). We can signal this as a simple bitmap indicating the interfaces that can only be used (each interface having a specific interface ID). This allows the multi-link set 560 to define if there are further restrictions (only during a certain service period, following a resource request, and/or other). We can have fields that define these restrictions, for instance: no probe requests (only passive scanning); pre-association exchange only during specific service periods that are advertised with this element; EDCA parameters for management frames and/or other; and/or other.

Some embodiments may be related to post-association management plane policy. This allows the multi-link set 560 to define which interface can be used for post-association frame exchange, as well as for negotiations between the multi-link set 560 and the non-AP device 570 or between the APs 502 and STAs 504 (example: power save negotiation, and/or other). We can signal this as a simple bitmap or a list of interface IDs indicating the interfaces that can only be used (each interface having a specific interface ID), or a list of interface IDs. If there are different interfaces for different exchanges, we can have a bitmap or a list of interface IDs for each specific exchange. For instance, the multi-link device can indicate if the beacons are sent on all APs 502 or only some of them, if the TIM element in beacons are sent on all APs 502 or only some of them, and/or other. And it can indicate if TWT negotiation can be done in any bands or only some of them.

Some embodiments may be related to multi-link device discovery. In EHT, we expand the framework of operation between two STAs 504 (FIG. 19, where one link is established) to operation between two devices, where each device has multiple STAs 504. In some descriptions herein, device 1 (1910 in FIG. 19) is called a multi-link device, but the scope of embodiments is not limited in this respect. In some cases, the device may be called a "multi-link logical entity" or other. In some embodiments, each Multi-link device will have a MAC data service interface and primitive to LLC as defined in 5.2 MAC data service specification. As a result, from the LLC point of view, it can request the lower layer to transmit data or get data from the lower layer without having the knowledge of one or multiple links. For routing reason, each multi-link device needs an address to communicate to the DSM (distribution system medium) in order for the packet to be routing in DSM. Note that the address for DSM maybe same or different from the MAC address used in the WM. An example is shown in FIG. 19.

In some embodiments, there will be a multi-link setup procedure between multi-link device 1 (such as 2030 in FIG. 20) and multi-link device 2 (such as 2035 in FIG. 20). For infrastructure operation, multi-link device 1 can have all STAs to be AP, and multi-link device 2 can have all STAs to be non-AP.

In some embodiments, WFA OCE mandates that if an AP 502 has co-located APs operating in the same device on different channels/bands, it shall include in beacons and probe responses a Reduced Neighbor Report element (RNR) that describes all these co-located APs 502. 802.11ax spec also mandate that if an AP has a co-located AP operation at 6 GHz on the same device, it shall include in beacons and probe responses a Reduced Neighbor Report element (RNR) that describes all these co-located APs.

In some embodiments, the RNR is defined as follows. It includes multiple Neighbor AP information fields, one for each operating channel. Example fields are shown in FIG. 21. Each Neighbor AP Information field 2100 can then contain multiple TBTT Information Fields 2110, one for each reported AP operating on that channel.

In an example scenario, all APs 502 are discoverable by legacy STAs 504 (3-band APs: 2.4/5/6). Beacons and probe responses sent by each AP 502 of the multi-link AP device 510 already include an RNR describing all the other APs 502 of the multi-band device 510. The 2.4 GHz AP beacon includes an RNR describing the other APs 502 (the 5 GHz AP (if the AP is an OCE AP) and the 6 GHz APs 502 (mandated by 11ax)). The RNR includes already the operating class/channel, TBTT offset, BSSID, short SSID, and BSS parameters. In some embodiments, more discovery information for a multi-AP device 510 (policy, capabilities, and/or other) may be used. In some embodiments, it may not be desirable to duplicate information already present in RNR, but another element (that could be called Multiple AP element or other) may be used, and may provide complementary information. In some embodiments, this element could have a structure similar to the multiple BSSID element, with a main AP description and inheritance for other APs 502.

Some embodiments may enable the discovery of the APs 502 of a multi-link AP device 510 by any APs 502 of the multi-link AP device 510 by providing the information using: both the RNR and a new element (Multi-link AP device element); the new element only, if the RNR is not included in the same frame. It is proposed to include a new field in the TBTT Information field of the RNR, that indicates if the AP 502 that is reported is part of the same Multi-AP device 510 as the reporting AP 502, and what is his AP-ID in the device. The AP-ID will be able to be used in other fields.

It is proposed to define a new Multi-link AP device element, that includes: one Multi-link AP device common information sub-element, that carries information that are common to the device; and multiple "AP" sub-elements, one for each AP from the Multi-AP element that is reported. Any or many different elements can be included in the AP sub-element (EDCA parameters, policy, EHT/HE operation elements, and/or other). In some embodiments, the size of the element may be reduced by defining inheritance rules between the reporting AP 502 and the APs 502 reported in the multi-link AP device element.

Some embodiments may be related to the Multi-Link AP device element (name can change based on agreed terminology). In the following, it is assumed that multi-link device 1 has APs 502 (multi-link AP device 510) and multi-link device 2 has non-AP STAs 504 (multi-link non-AP device 520). In FIG. 22, an example of a multi-link AP device element 2210 is shown, and an example of an AP description sub-element 2220 is shown. In some embodiments, a control field may indicate if at least one RNR Information Present field indicating that RNR information is present or not. When present, RNR Information may include one or more of: operating class, operating channel, BSSID, TBTT offset, BSS Parameters, Multi-AP device info, co-located, and/or other. If the AP 502 is described in the RNR that is present in the same frame, only the Multi-AP device information field of the RNR information is included in the AP description sub-element. If the AP is not described in the RNR that is present in the same frame, the RNR information is included in the AP description sub-element. Any elements can be included in Optional sub-elements (EDCA parameters, EHT operation element, EHT capabilities, and/or other).

Some embodiments relate to rules for inheritance. In one option (referred to for clarity as "Option 1"), if the element is not included in the optional sub-element part, that means that the element is the same as the one sent in the beacon of the reporting AP 502. In another option (referred to for clarity as "Option 2"), an "inheritance active" bit is set to 1 if same as option 1, and set to 0 if there is no inheritance. The inheritance active bit may be either in the Control field of the AP description sub-element or in the Common info of the AP MSD element.

In some embodiments, common info may include one or more of: MAC SAP address (or AA: authentication server address); multi-AP capabilities (shared buffers and/or other); one or more policies; security related info (could be also in AP description sub-element); and/or other.

Some embodiments may be related to modification of the RNR to include the AP-ID information. It is proposed to define a new field in the TBTT Information field of the RNR, that indicates if the AP that is reported is part of the same Multi-AP device as the reporting AP, and what is his APID in the device. A non-limiting example of a TBTT information field 2230 is shown in FIG. 22. In addition, a non-limiting example of the multi-link AP device information field 2235 is also shown in FIG. 22. In the multi-link AP device information field 2235, the field "Part of Multi-AP device" 2240 is set to 1 if the reported AP is part of the same Multi-link device as the reporting AP 502. The field "APID" 2242 is set to the value of the APID corresponding to the one of the reported AP in the Multi-link device.

In some embodiments, one or more other fields could be also added. In some embodiments, the Multi-link AP device ID field, if it is desired that there could be multiple Multi-link AP device/logical entities, or if it is desired that the reported AP is described to be part of a Multi-link AP device that does not include the Reporting AP. In some embodiments, signaling may be included, wherein the signaling may be related to the address of the MAC SAP if we have the possibility of 3 levels for the multi-link operation (STA, Multi-link AP device that is a group of STAs/APs that have a single MAC SAP to the upper layers, Set of Multi-link AP device: group of Multi-link AP devices). In that case, the signaling could be the address of the MAC SAP, for instance.

Some embodiments may be related to considerations for Multi-BSSID. At 6 GHz, there may be a single beacon for all co-located BSSIDs, transmitted by the Transmitted BSSID with a multiple BSSID element. The Multi-AP element may be included in each non-transmit BSSID profile. In some embodiments, a double inheritance may be used: inheritance of the AP subelement from the non-transmit BSSID profile, and inheritance of the non-transmit BSSID profile from the transmitted BSSID profile.

Some embodiments are related to multi-link policy signaling for EHT. Some embodiments may include specification of the multi-link policy either in a separate Multi-link Policy element, or as a set of fields that can be included in an existing element. The format of the Multi-link Policy signaling may include two parts: the Common Policy part that defines the policy applied across all active links maintained by a Multi-link AP device, and several Link Specific Policy parts, each of which defines the policy that only applies to one specific link. In some cases, the proposed Multi-link Policy signaling establishes a unified framework that is flexible enough to apply multi-link operations to address different use cases.

Some embodiments may include specification and/or advertisement of the Multi-link policy enforced by a Multi-link AP device, which STAs have to comply with. The Multi-link Policy is included in frames like Beacon frame and Probe Response frame. The Multi-link AP device can dynamically adjust certain parameters of Multi-band Policy according to specific use cases it currently focuses, by simply updating the Multi-link Policy and advertising it to STAs. This Multi-link Policy could be a separate element, or part of another element.

In some embodiments, if the Multi-link Policy is included in a separate element, then we call it the Multi-link Policy element, and the proposed format is shown in the table below.

| | Element ID | Length | Element ID Extension | Common Policy | Link Specific Policy | Link Specific Policy | ... | Link Specific Policy |
|---|---|---|---|---|---|---|---|---|
| Octets | 1 | 1 | 1 | TBD | TBD | TBD | ... | TBD |

In some embodiments, some aspects of the Multi-link policy apply across different links (like band transition and aggregation), while some can be link-dependent (like TIDs allowed, channel access). It is proposed to define the Multi-link Policy element as follows: the Common Policy sub-element defines the policy applied across all active links; the Common Policy sub-element can be further divided into different fields, each of which corresponding to the policy information for a specific aspect of the Multi-link operations (Pre-association, Post-association management or data plane etc.); the Common Policy sub-element shall always be present in the Multi-link Policy element; each Link Specific Policy sub-element defines the policy that only applies to one specific link; and/or other.

In some embodiments, the Multi-link Policy element may be transmitted in all active bands operated by the Multi-link AP device. FIG. 23 illustrates the relationship of the signaling of the Multi-link Policy element and the actual policy enforced upon different links maintained by a Multi-link AP device. If the Multi-link Policy is based on a set of fields in an existing element or frame, then the signaling may be almost the same, i.e., we still have the Common Policy part and several Link Specific Policy parts.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a multi-link access point (AP) device comprising multiple APs, the multi-link AP device configured for multi-link communication on a plurality of channels,
wherein the APs of the multi-link AP device share a common medium access control (MAC) service access point (SAP) address to a logical link control (LLC) entity of the multi-link AP device,
wherein for each channel of the plurality of channels, at least one of the APs of the multi-link AP device is configured for communication on the channel,
wherein the multi-link AP device comprises: memory; and processing circuitry, wherein the processing circuitry is configured to:
encode a frame for transmission by one of the APs of the multi-link AP device, wherein the processing circuitry is configured to encode the frame to include signaling to enable multi-link discovery of the APs of the multi-link AP device,
wherein the processing circuitry is configured to encode the signaling to include:
a reduced neighbor report (RNR) element that identifies the APs of the multi-link AP device, and
a multiple AP element configurable to include:
common information for the APs of the multi-link AP device, and
per-AP sub-elements that include per-AP information related to the APs of the multi-link AP device.

2. The apparatus according to claim 1, wherein the per-AP information is related to policies of the APs of the multi-link AP device, wherein the policies are related to one or more of:
initiation of a multi-link association with the multi-link AP by a multi-link station (STA) device that discovers the multi-link AP device,
exchange of management frames and power save negotiation frames between the multi-link STA device and the multi-link AP device, and
interfaces for data exchange between the multi-link STA device and the multi-link AP device.

3. The apparatus according to claim 1, wherein the per-AP information is related to policies of the APs of the multi-link AP device, the policies related to one or more of:
reception of traffic indication map (TIM) information or target wake time (TWIT) information by a multi-link station (STA) device that discovers the multi-link AP device, and
reception of broadcast traffic or multi-cast traffic by the multi-link STA device.

4. The apparatus according to claim 1, wherein
the per-AP information is related to policies of the APs of the multi-link AP device, and
the policies are related to whether a transition of one or more traffic IDs (TIDs) between channels is decided by the multi-link AP device or is negotiated between the multi-link AP device and a multi-link station (STA) device that discovers the multi-link AP device.

5. The apparatus according to claim 1, the processing circuitry further configured to:
encode the RNR element to indicate whether the APs are part of the mu AP device.

6. The apparatus according to claim 1, the processing circuitry further configured to:
encode each of the per-AP sub-elements to indicate whether inheritance of information in the per-AP sub-elements is to be used in the multi-link discovery.

7. The apparatus according to claim 1, the processing circuitry further configured to:
encode the per-AP sub-elements to include one or more enhanced distributed channel access (EDCA) parameters.

8. The apparatus according to claim 1, the processing circuitry further configured to:

encode the common information to include a medium access control (MAC) service access point (SAP) address of the multi-link AP device.

9. The apparatus according to claim 1, the processing circuitry further configured to:
encode the common information to include information related to shared buffer capabilities of the APs of the multi-link AP device.

10. The apparatus according to claim 1, the processing circuitry further configured to:
encode the RNR element to include:
for each of the channels of the plurality of channels: a neighbor AP information field that includes an operating class of the channel and a channel number, and
for each of the neighbor AP information fields, for each of the APs operating on the channel corresponding to the neighbor AP information field: a target beacon transmission time (TBTT) information field that includes a TBTT offset of the AP.

11. The apparatus according to claim 10, the processing circuitry further configured to:
encode each of the TBTT information fields to indicate:
whether the AP corresponding to the TBTT information field is part of the multi-link AP device, and
a corresponding AP ID.

12. The apparatus according to claim 1, wherein the frame is a beacon frame or a probe response frame.

13. The apparatus according to claim 1, wherein:
the channels are included in a first frequency band in a 2.4 giga-Hertz (GHz) range, in a second frequency band in a 5 GHz range, or in a third frequency band in a 6 GHz range, and
at least two of the channels are in different frequency bands.

14. The apparatus according to claim 1, wherein:
the processing circuitry includes a baseband processor to encode the frame,
the apparatus further comprises a transceiver to transmit the frame, and
the memory is configured to store at least a portion of the frame.

15. A non-transitory computer-readable storage medium that stores instructions for execution of operations by processing circuitry of a multi-link station (STA) device comprising multiple STAs, the multi-link STA device configured for multi-link communication on a plurality of channels,
wherein the STAs of the multi-link STA device share a common medium access control (MAC) service access point (SAP) address to a logical link control (LLC) entity of the multi-link STA device,
wherein for each channel of the plurality of channels, at least one of the STAs of the multi-link STA device is configured for communication on the channel,
wherein the operations configure the processing circuitry to:
decode a frame from an access point (AP) of a multi-link AP device comprising multiple APs, wherein the frame includes signaling for multi-link discovery of the APs of the multi-link AP device, wherein the signaling includes:
a reduced neighbor report (RNR) element that identifies the APs of the multi-link AP device, and
a multiple AP element configurable to include:
common information for the APs of the multi-link AP device, and
per-AP sub-elements that include information related to policies of the APs of the multi-link AP device.

16. The non-transitory computer-readable storage medium according to claim 15, wherein the operations further configure the processing circuitry to:
if a corresponding per-AP sub-element for one of the APs of the multi-link AP device does not include one or more operating parameters, determine values for the one or more operating parameters based on an inheritance of previous values of the one or more operating parameters.

17. The non-transitory computer-readable storage medium according to claim 15, wherein the operations further configure the processing circuitry to:
determine one or more operating parameters of one of the APs of the multi-link AP device based on an inheritance indicator included in the per-AP sub-element corresponding to the AP,
wherein the operations further configure the processing circuitry to:
if the inheritance indicator indicates that an inheritance is to be used, determine values of the one or more operating parameters based on previous values of the one or more operating parameters; and
if the inheritance indicator indicates that the inheritance is not to be used, determine values of the one or more operating parameters based on values included in the per-AP sub-element.

18. A method, comprising:
encoding a frame for transmission, wherein the frame is encoded to include signaling to enable multi-link discovery of multiple access points (APs) of a multi-link AP device operating in a plurality of channels, wherein the APs of the multi-link AP device share a common medium access control (MAC) service access point (SAP) address to a logical link control (LLC) entity of the multi-link AP device, wherein the signaling is encoded to include:
a reduced neighbor report (RNR) element that identifies the APs of the multi-link AP device, and
a multiple AP element configurable to include:
common information for the APs of the multi-link AP device, and
per-AP sub-elements that include per-AP information related to the APs of the multi-link AP device.

19. The method according to claim 18, wherein the frame is a beacon frame or a probe response frame.

* * * * *

UNITED STATES PATENT AND TRADEMARK OFFICE
CERTIFICATE OF CORRECTION

PATENT NO. : 11,134,542 B2
APPLICATION NO. : 16/825028
DATED : September 28, 2021
INVENTOR(S) : Stacey et al.

Page 1 of 1

It is certified that error appears in the above-identified patent and that said Letters Patent is hereby corrected as shown below:

In the Claims

In Column 35, Line 52, in Claim 1, delete "multi-fink" and insert --multi-link-- therefor In Column 36, Line 37, in Claim 3, delete "(TWIT)" and insert --(TWTT)-- therefor In Column 36, Line 55, in Claim 5, delete "mu" and insert --multi-link-- therefor Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*